United States Patent
Sugamoto et al.

(10) Patent No.: US 11,153,014 B2
(45) Date of Patent: Oct. 19, 2021

(54) TRANSMITTING APPARATUS AND TRANSMITTING METHOD

(71) Applicant: FUJITSU LIMITED, Kawasaki (JP)

(72) Inventors: Masamichi Sugamoto, Kawasaki (JP); Ryo Murakami, Kawasaki (JP); Yuichiro Tanaka, Koto (JP); Junichi Sugiyama, Kawasaki (JP); Kenichi Miyama, Ashikaga (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/903,475

(22) Filed: Jun. 17, 2020

(65) Prior Publication Data

US 2020/0403707 A1  Dec. 24, 2020

(30) Foreign Application Priority Data

Jun. 24, 2019 (JP) .............................. JP2019-116404

(51) Int. Cl.
*H04J 14/02* (2006.01)
*H04B 10/556* (2013.01)
*H04Q 11/00* (2006.01)

(52) U.S. Cl.
CPC .......... *H04B 10/556* (2013.01); *H04J 14/021* (2013.01); *H04Q 11/0005* (2013.01); *H04Q 2011/0016* (2013.01)

(58) Field of Classification Search
CPC ... H04B 10/556; H04B 10/501; H04J 14/021; H04J 14/0241
See application file for complete search history.

(56) References Cited

U.S. PATENT DOCUMENTS

| 6,657,970 B1 * | 12/2003 | Buckingham ....... H04L 12/6418 370/249 |
| 2015/0281129 A1 * | 10/2015 | Kono ................... H04J 3/1664 370/359 |
| 2017/0041067 A1 * | 2/2017 | Goto ................. H04B 10/07953 |
| 2018/0219632 A1 * | 8/2018 | Yoshida ............... H04B 10/541 |
| 2019/0342028 A1 * | 11/2019 | He ....................... H04B 10/613 |

FOREIGN PATENT DOCUMENTS

| JP | 2012-242110 A | 12/2012 |
| JP | 2015-188172 A | 10/2015 |
| JP | 2018-050136 A | 3/2018 |

* cited by examiner

*Primary Examiner* — Dzung D Tran

(74) *Attorney, Agent, or Firm* — Fujitsu Patent Center

(57) ABSTRACT

A transmitting apparatus includes: a first processor circuit; a second processor circuit; a modulation circuit; and a switch circuit, wherein the first processor circuit is configured to execute a generating process that includes mapping each of a plurality of bit strings to a symbol in predetermined order for each number of bits according to a multivalued degree of a multilevel modulation method, and generating a symbol information piece according to the symbol, wherein the modulation circuit is configured to modulate light in accordance with the symbol information piece based on the multilevel modulation method; wherein the second processor circuit is configured to execute a detecting process that includes detecting each of inputs of a plurality of data signals, wherein the switch circuit is configured to select the plurality of bit strings based on a detection result of inputs of the plurality of data signals.

6 Claims, 17 Drawing Sheets

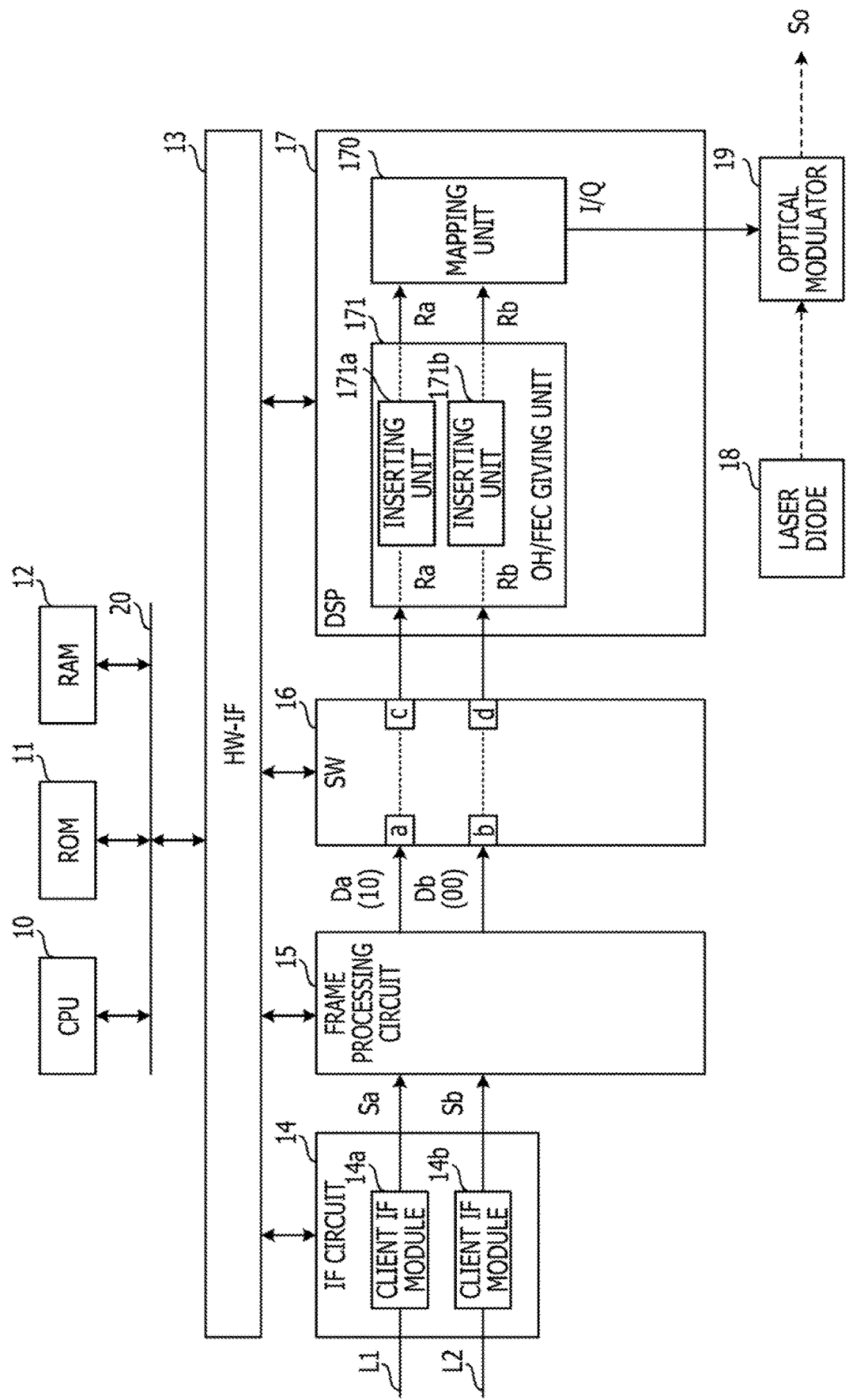

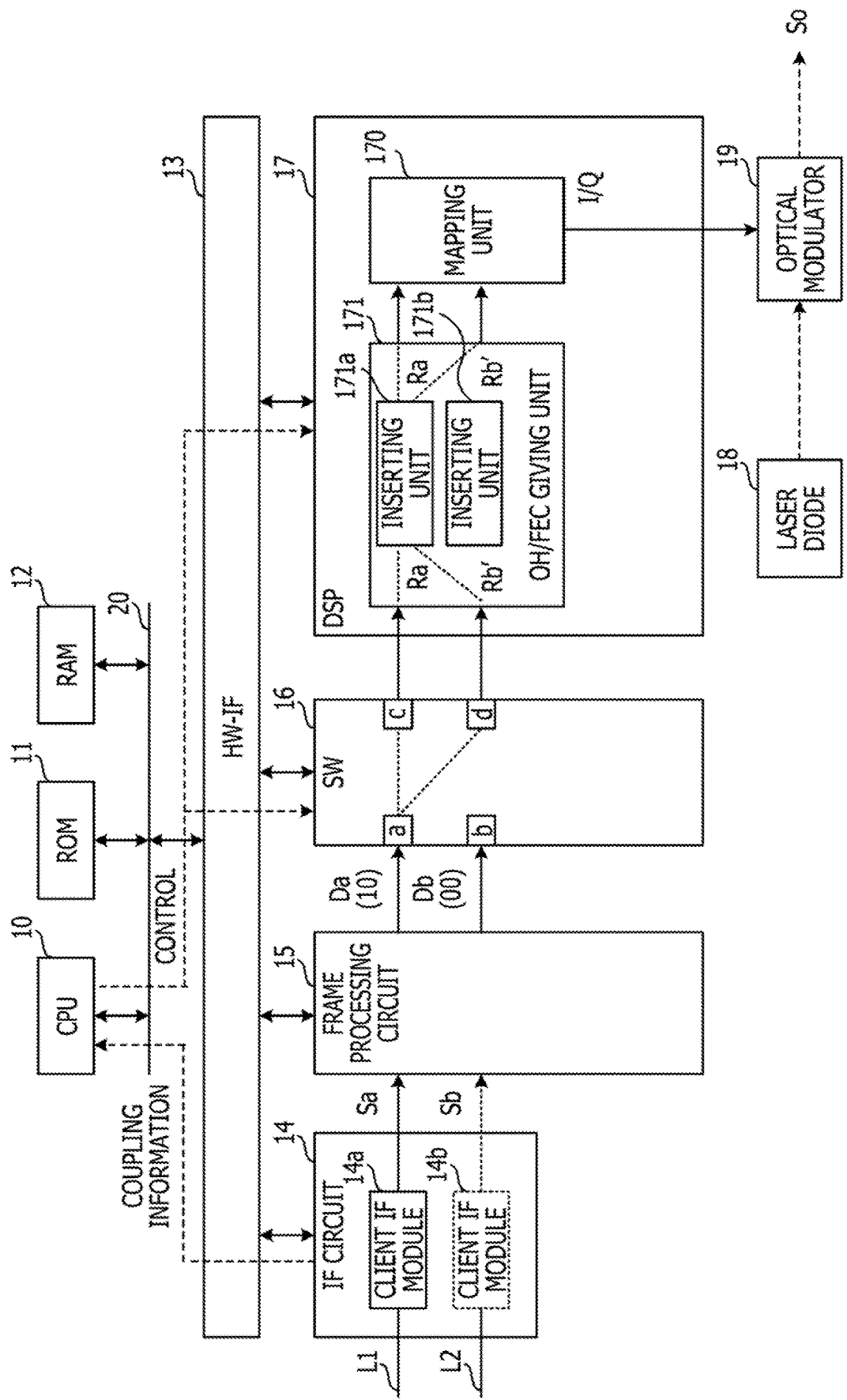

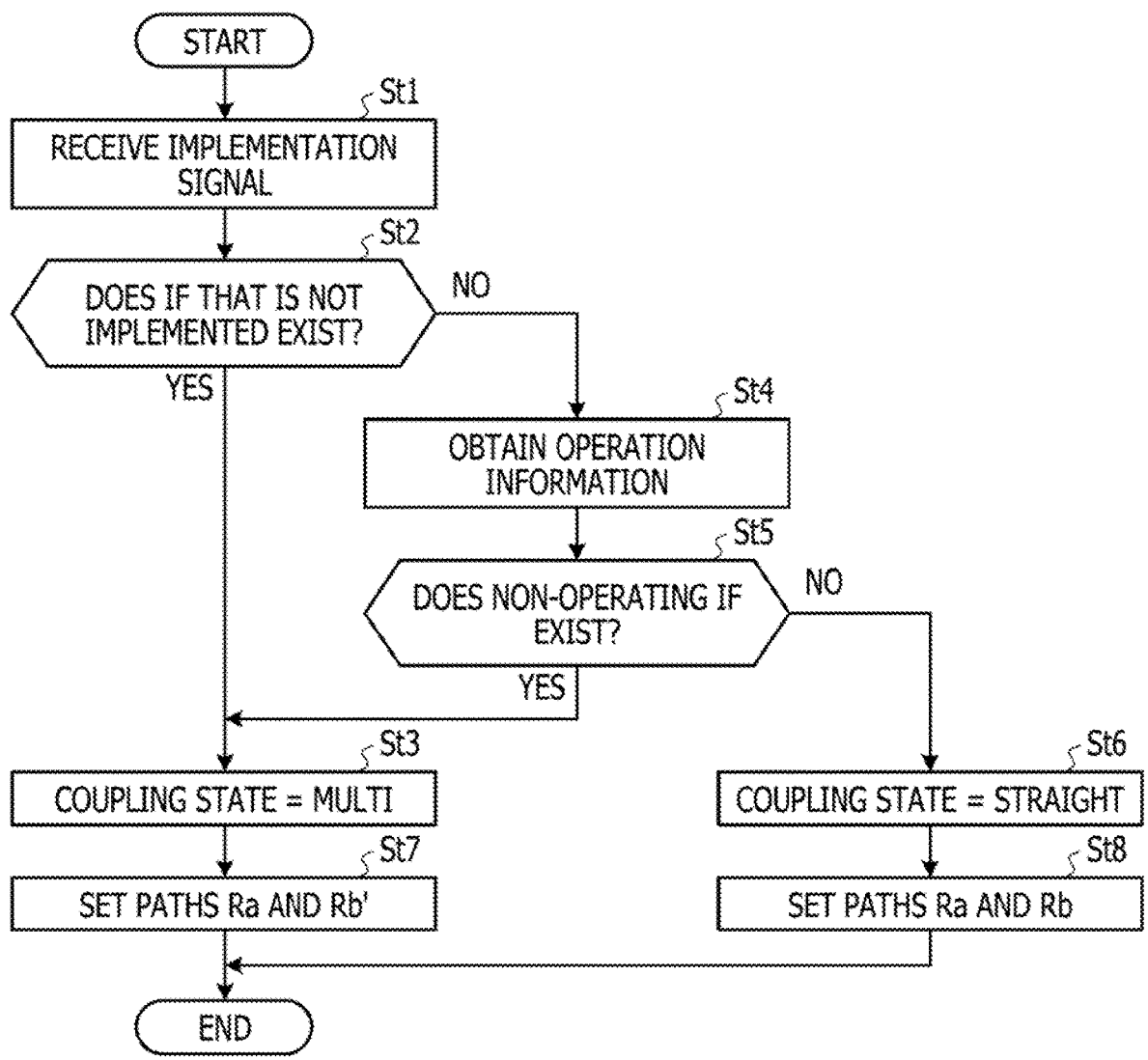

TRANSMITTING APPARATUS AND TRANSMITTING METHOD

CROSS-REFERENCE TO RELATED APPLICATION

This application is based upon and claims the benefit of priority of the prior Japanese Patent Application No. 2019416404, filed on Jun. 24, 2019, the entire contents of which are incorporated herein by reference.

FIELD

The embodiments discussed herein are related to a transmitting apparatus and a transmitting method.

BACKGROUND

For example, a transmitting apparatus has been proposed that receives data signals from a plurality of interfaces of a client line side and generates an optical signal through multilevel modulation such as quadrature phase shift keying (QPSK). When one of the interfaces is not used, a data signal is not input from the interface. Thus, a data signal having a random value is generated as a dummy and is used for multilevel modulation.

Examples of the related art include Japanese Laid-open Patent Publication No. 2012-242110.

SUMMARY

According to an aspect of the embodiments, a transmitting apparatus includes: a first processor circuit; a second processor circuit; a modulation circuit; and a switch circuit, wherein the first processor circuit is configured to execute a generating process that includes mapping each of a plurality of bit strings to a symbol in predetermined order for each number of bits according to a multivalued degree of a multilevel modulation method, and generating a symbol information piece according to the symbol, wherein the modulation circuit is configured to modulate light in accordance with the symbol information piece based on the multilevel modulation method; wherein the second processor circuit is configured to execute a detecting process that includes detecting each of inputs of a plurality of data signals, wherein the switch circuit is configured to select the plurality of bit strings based on a detection result of inputs of the plurality of data signals, wherein the second processor circuit is further configured to execute a first selecting process when an input of each of the plurality of data signals is detected by the detecting process, the selecting process being configured to cause the switch circuit to select a bit string included in each of the plurality of data signals, and execute a second selecting process when an input of at least one of the plurality of data signals is not detected by the detecting process, the second selecting process being configured to cause the switch circuit to select a bit string included in the data signal the input of which is detected instead of the data signal the input of which is not detected such that the identical symbol information pieces are serially generated in the predetermined order.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a configuration diagram illustrating a transmitter of a third embodiment;

FIG. 16 is a diagram illustrating an example of an operation for switching a path through an inserting unit; and FIG. 17 is a flowchart illustrating another example of processing for controlling a coupling state of a switch circuit.

DESCRIPTION OF EMBODIMENT(S)

In frequency bands occupied by an optical signal, a band occupied by a data signal having a random value does not contribute to transmission of effective data and is therefore wasteful. On the other hand, when a transmission rate is set based on the number of effective client interfaces, a wasteful frequency band may be suppressed because a data signal having a random value may not be used.

However, in this case, because the frequency of the clock signals for reading out the data signals is changed, a digital signal processor (DSP) that processes the multilevel modulation, for example, is restarted. Therefore, the communication is interrupted for a long period of time.

Accordingly, it is an object of the embodiments to provide a transmitting apparatus and a transmitting method that may suppress a waste of a frequency band without interrupting communication for a long period of time.

As one aspect, a waste of a frequency band may be suppressed without interrupting communication for a long period of time.

Figure 1:
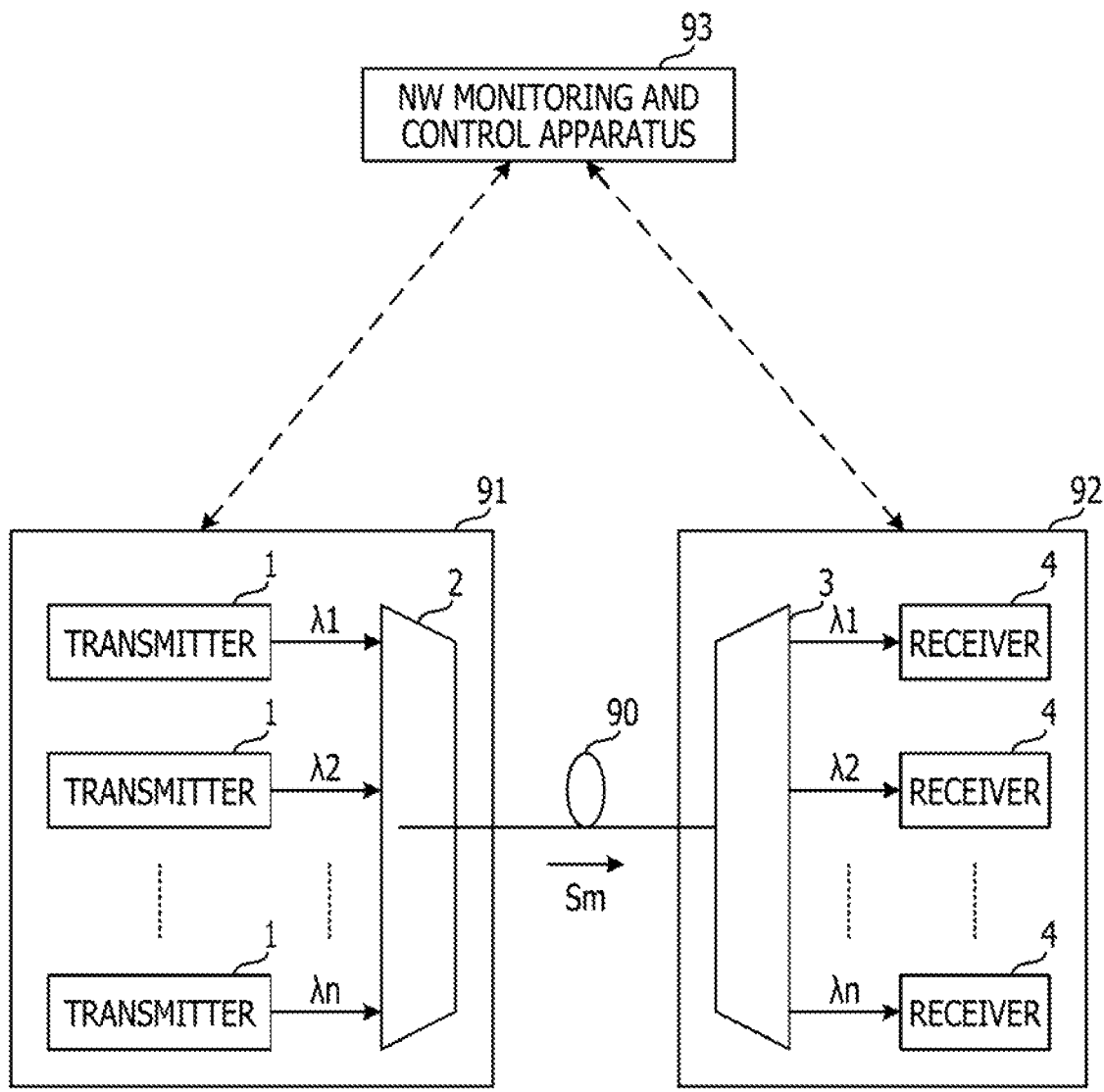
FIG. 1 is a configuration diagram illustrating an example of a transmission system.

FIG. 1 is a configuration diagram illustrating an example of a transmission system. The transmission system includes a wavelength multiplexing apparatus 91, a wavelength demultiplexing apparatus 92, and a network (NW) monitoring and control apparatus 93.

The wavelength multiplexing apparatus 91 and the wavelength demultiplexing apparatus 92 are coupled to each other through a transmission path 90 such as optical fiber. The wavelength multiplexing apparatus 91 multiplexes optical signals having wavelengths λ1 to λn different from each other (where n: an integer equal to or higher than 2), generates a wavelength multiplexed optical signal Sm and transmits it to the transmission path 90. The wavelength demultiplexing apparatus 92 demultiplexes the wavelength multiplexed optical signal Sm input through the transmission path 90 into signals having wavelengths λ1 to λn and receives them. The wavelength multiplexing apparatus 91 and the wavelength demultiplexing apparatus 92 may be a reconfigurable optical add/drop multiplexer (ROADM), for example, but are not limited thereto.

The wavelength multiplexing apparatus 91 has a plurality of transmitters 1 that transmit optical signals having different wavelengths λ1 to λn and a wavelength multiplexing unit 2 that wavelength-multiplexes the optical signals having the wavelengths λ1 to λn. The wavelength multiplexing unit 2 may be, for example, an optical coupler or an optical filter but is not limited thereto. The wavelength multiplexing unit 2 outputs to the transmission path 90 a wavelength multiplexed optical signal Sm acquired by wavelength-multiplexing optical signals having wavelengths λ1 to λn.

The wavelength demultiplexing apparatus 92 has a wavelength demultiplexing unit 3 that demultiplexes the wavelength multiplexed optical signal Sm into signals having wavelengths λ1 to λn and a plurality of receivers 4 that receives optical signals having the wavelengths λ1 to λn. The wavelength demultiplexing unit 3 may be, for example, a wavelength divisional multiplexing (WDM) but is not limited thereto.

The network monitoring and control apparatus 93 monitors and controls the wavelength multiplexing apparatus 91 and the wavelength demultiplexing apparatus 92 via an unillustrated monitoring network. The network monitoring and control apparatus 93 may be, for example, a network element operation system (NE-OpS) but is not limited thereto.

First Embodiment

Figure 2:
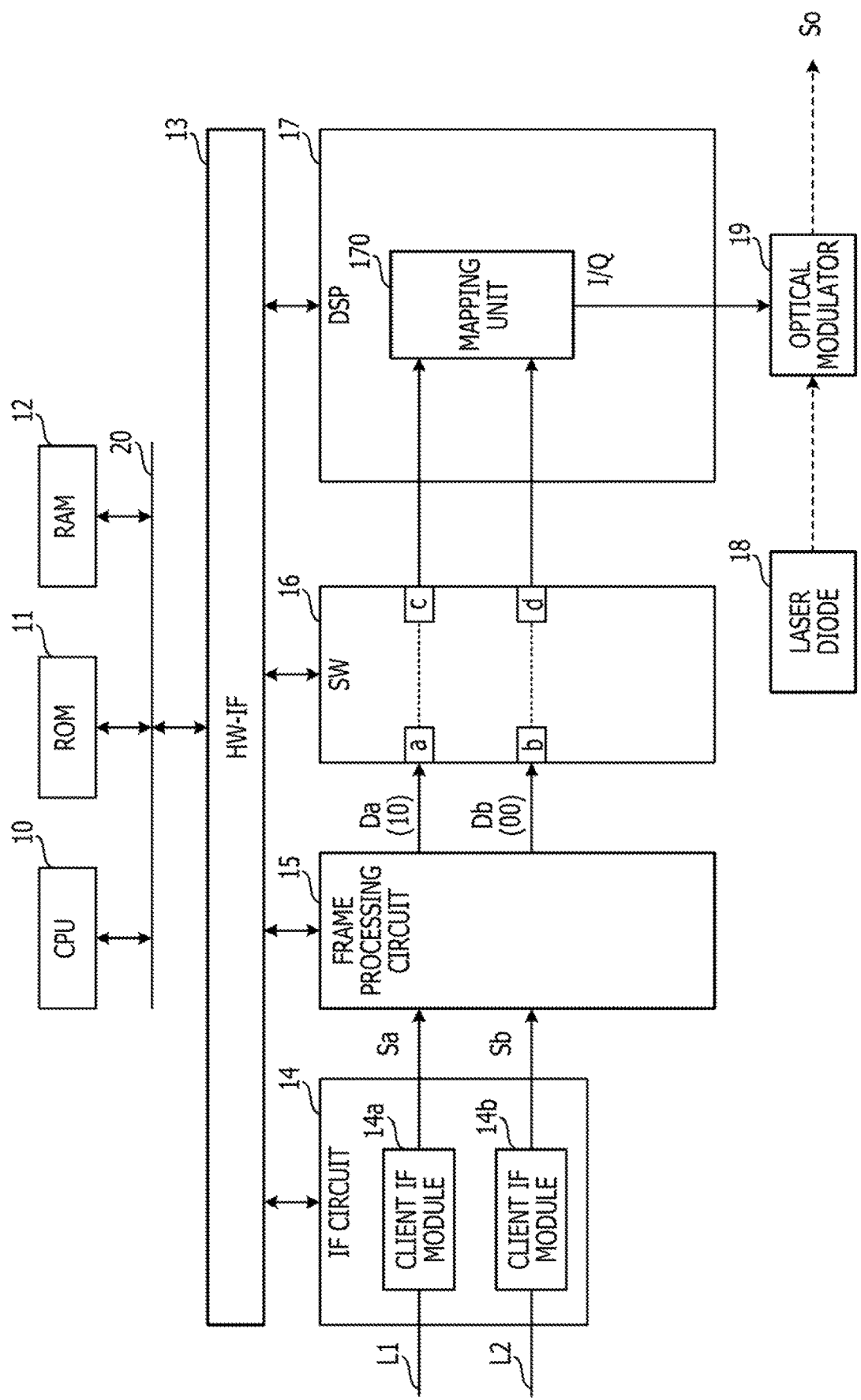
FIG. 2 is a configuration diagram illustrating a transmitter 1 of a first embodiment.

FIG. 2 is a configuration diagram illustrating a transmitter 1 of a first embodiment. The transmitter 1 is an example of the transmitting apparatus and generates an optical signal So having predetermined wavelengths λ1 to λn and transmits it.

The transmitter 1 has a central processing unit (CPU) 10, a read-only memory (ROM) 11, a random-access memory (RAM) 12, and a hardware interface unit (HW-IF) 13. The CPU 10 is coupled to the ROM 11, the RAM 12, and the HW-IF 13 through a bus 20 so as to enable mutual inputting/ outputting of signals.

In the ROM 11, a program for driving the CPU 10 is stored. The RAM 12 functions as a working memory for the CPU 10.

The transmitter 1 further has an interface (IF) circuit 14, a frame processing circuit 15, a switch circuit (SW) 16, a digital signal processor (DSP) 17, a laser diode 18, and an optical modulator 19. The interface circuit 14, the frame processing circuit 15, the switch circuit 16, and the DSP 17 are coupled to the bus 20 via the HW-IF 13.

The HW-IF 13 is, for example, a circuit configured by hardware such as a field-programmable gate array (FPGA) or an application-specified integrated circuit (ASIC). The HW-IF 13 relays communication between the CPU 10 and the interface circuit 14, the frame processing circuit 15, the switch circuit 16 and the DSP 17.

The interface circuit 14 and the frame processing circuit 15 are circuits configured by hardware such as an FPGA or an ASIC.

To the interface circuit 14, detachable client interface modules (client IF modules) 14a and 14b are coupled. The client IF module 14a receives a client signal Sa from a client line L1 and outputs it to the frame processing circuit 15. The client IF module 14b receives a client signal Sb from a client line L2 and outputs it to the frame processing circuit 15. The client signals Sa and Sb are examples of a data signal. The client signals Sa and Sb may be, for example, Ethernet (registered trademark, the same is true below) signals but are not limited thereto.

Each of the client IF modules 14a and 14b is an example of a device and is, for example, a circuit substrate having a photodiode, a signal processing circuit, an electric coupler (not illustrated), and so on. The client IF modules 14a and 14b are electrically coupled to the interface circuit 14. FIG. 2 illustrates a state that both of the client IF modules 14a and 14b are implemented in the interface circuit 14.

The interface circuit 14 outputs, for example, an implementation signal indicating whether the client IF modules 14a and 14b are implemented or not to the CPU 10 via the HW-IF 13. The CPU 10 determines whether each of the client IF modules 14a and 14b is implemented in the transmitter 1 or not based on the implementation signal.

The interface circuit 14 reads out operation information from the client IF modules 14a and 14b and outputs it to the CPU 10 via the HW-IF 13. The CPU 10 determines whether each of the client IF modules 14a and 14b has an operating state or not based on the operation information. If the client IF modules 14a and 14b have an operating state, the client IF modules 14a and 14b transmit and receive client signals Sa and Sb, respectively. If the client IF modules 14a and 14b have a non-operating state, the transmission and reception of the client signals Sa and Sb are stopped.

The frame processing circuit 15 extracts data from the client signals Sa and Sb and outputs them to the switch circuit 16 as bit strings Da and Db. For example, the frame processing circuit 15 converts data included in a payload of the client signal Sa to a binary bit string Da and converts data included in a payload of the client signal Sb to a binary bit string Db.

When the client signals Sa and Sb are not input, the frame processing circuit 15 outputs bit strings Da and Db of random values, for example, to the switch circuit 16. For example, the frame processing circuit 15 changes the bit strings Da and Db to random values in accordance with the voltages of input terminals of the client signals Sa and Sb, for example. The bit strings Da and Db are not limited to random values but may be a fixed value of a logical value "1" or "0".

The switch circuit 16 is an electric switch having a 2×2 port configuration as an example. The switch circuit 16 has ports a to d. The ports a and b are input ports to which the bit strings Da and Db are input, and the ports c and d are output ports from which the bit strings Da and Db are output.

The switch circuit 16 switches the coupling states of the ports a and b and the ports c and d under control of the CPU 10. Thus, the switch circuit 16 selects bit strings Da and Db to be output from the ports c and d. The switch circuit 16 is an example of a selecting unit and a selector.

FIG. 2 illustrates a state that the port a and the port c are coupled and the port b and the port d are coupled. Hereinafter, this coupling state is called a "straight" state. The bit string Da is output from the port c to the DSP 17, and the bit string Db is output from the port d to the DSP 17.

The DSP 17 is a circuit that performs signal processing on the bit strings Da and Db. The DSP 17 has a mapping unit 170 that allocates symbols within a QPSK constellation to the bit strings Da and Db. QPSK is an example of multilevel modulation.

The mapping unit 170 maps the bit strings Da and Db to symbols in predetermined order for each number of bits (2 bits) according to the multivalued degree (2) of QPSK and generates symbol information pieces I/Q according to the symbols. Thus, the frame processing circuit 15 outputs the bit strings Da and Db in units of 2 bits. The mapping unit 170 is an example of a generating unit and a generator.

For example, the bit string Da has a value of "10", and the bit string Db has a value of "00". The mapping unit 170 alternately maps the bit string Da input from the port c and the bit string Db input from the port d to symbols in units of 2 bits.

The mapping unit 170 outputs the symbol information pieces I/Q according to the values of the bit strings Da and Db to the optical modulator 19. The laser diode 18 outputs light having the wavelengths λ1 to λn as its center wavelength to the optical modulator 19.

The optical modulator 19 modulates the light from the laser diode 18 in accordance with the symbol information pieces based on QPSK. The optical modulator 19 may be, for example, a Mach-Zehnder modulator but is not limited thereto. The optical modulator 19 modulates the light from the laser diode 18 in accordance with the phase and amplitude of the light according to the symbol information pieces. Thus, the optical modulator 19 generates and outputs an optical signal So having wavelengths λ1 to λn. The optical modulator 19 is an example of a modulating unit.

Because the bit strings Da and Db are acquired from different client signals Sa and Sb, respectively, the values of the bit strings Da and Db simultaneously input to the mapping unit 170 may be different.

Figure 3:
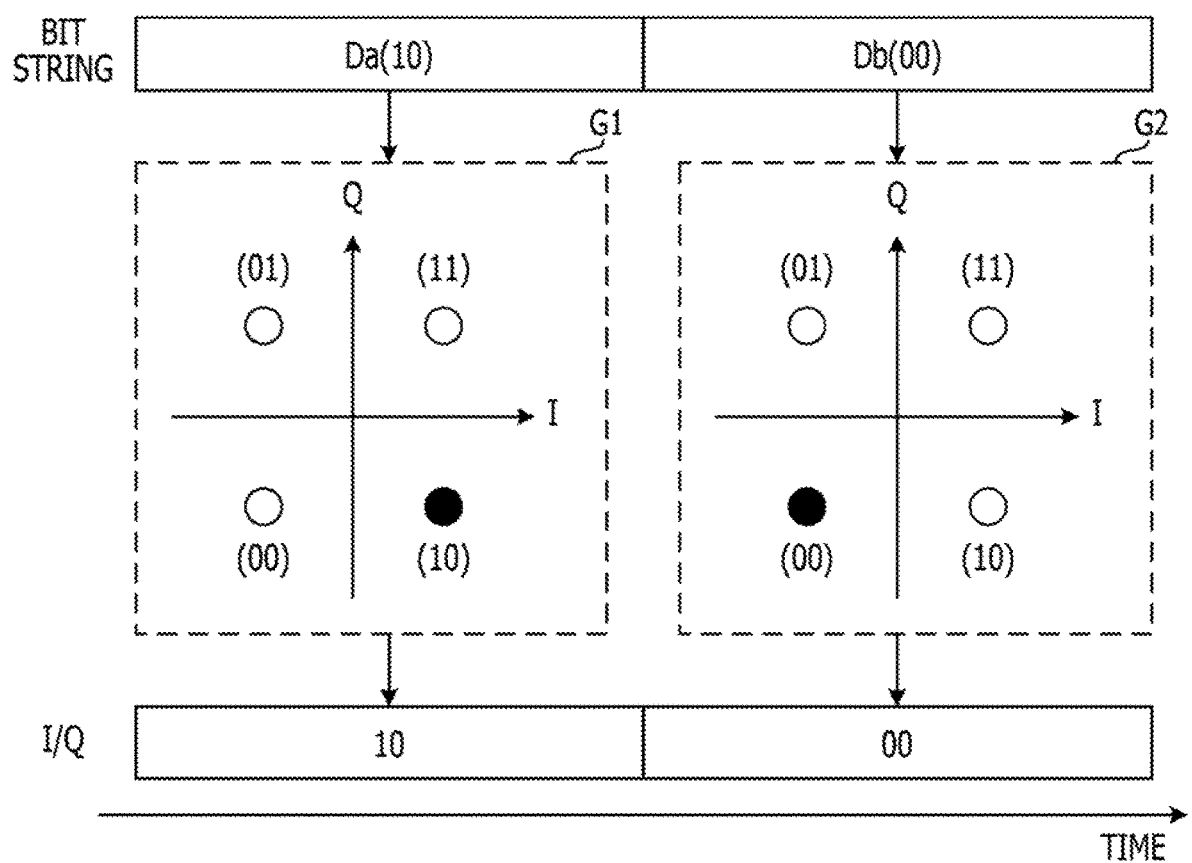
FIG. 3 is a diagram illustrating an example of processing for allocating symbols to bit strings having different values.

FIG. 3 is a diagram illustrating an example of processing for allocating symbols to the bit strings Da and Db having different values. FIG. 3 illustrates how symbols are sequentially allocated to the bit strings Da and Db to generate symbol information pieces I/Q in a time axis.

First, the mapping unit 170 allocates a QPSK symbol (10) according to the value "10" of the bit string Da (see Reference G1) and generates a symbol information piece I/Q according to the allocated symbol (10). Next, the mapping unit 170 allocates a QPSK symbol (00) according to the value "00" of the bit string Db (see Reference G2) and generates a symbol information piece I/Q according to the allocated symbol (00).

In this manner, the mapping unit 170 serially generates different symbol information pieces I/Q from the bit strings Da and Db having different values. The optical modulator 19 performs optical modulation by controlling the phase and amplitude of light from the laser diode 18 based on the symbol information pieces I/Q. For that, the modulation rate of the optical modulator 19 is equal to the rate at which one symbol is generated for each 2-bit string Da or Db.

Having described the example in which both of the client IF modules 14a and 14b are implemented in the transmitter 1 according to this embodiment, an operation in a case where one client IF module 14b is not implemented will be described below. When the client IF module 14b is not implemented, the frame processing circuit 15 outputs the bit string Db of a random value as dummy data. If the mapping unit 170 allocates a symbol to the bit string Db of a random value, the band occupied by the bit string Db of the random value in the frequency band of the optical signal So does not contribute to effective data transmission and is wasteful.

Accordingly, the switch circuit 16 switches the couplings between the ports a and b and the ports c and d such that the bit string Da of the client signal Sa from the client IF module 14a being implemented is output to the mapping unit 170 instead of the client signal Sb from the client IF module 14b not being implemented.

Figure 4:
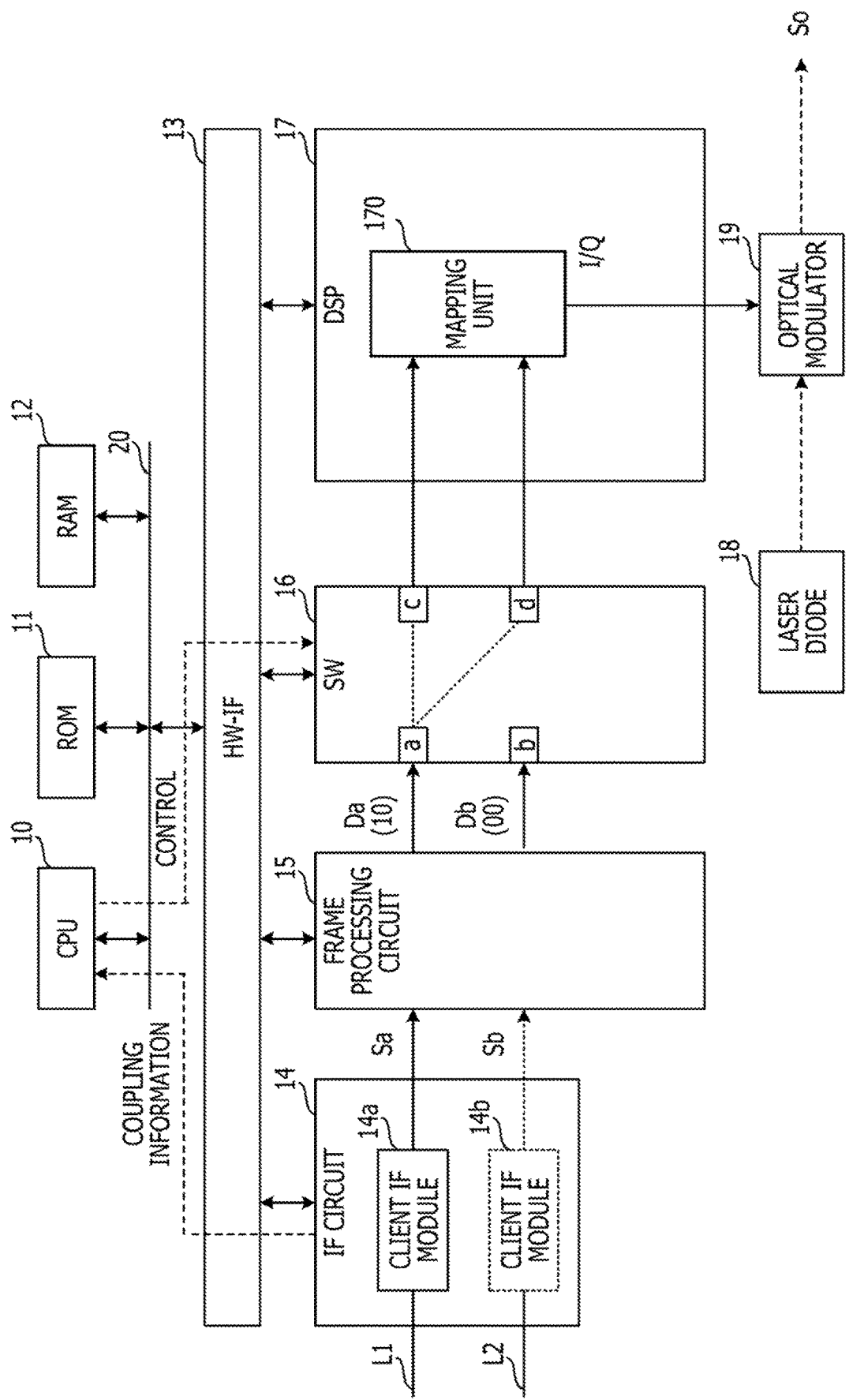
FIG. 4 is a diagram illustrating an example of an operation of a transmitter in a case where one client interface module is not implemented.

FIG. 4 is a diagram illustrating an example of an operation by the transmitter 1 in a case where one client IF module 14b is not implemented. In FIG. 4, constituents common to those in FIG. 2 are denoted by the same reference numerals, and description thereof is omitted.

The interface circuit 14 outputs to the CPU 10 coupling information indicating that the client IF module 14a is coupled and the client IF module 14b is not coupled. Based on the coupling information, the CPU 10 detects that the client signal Sa is input and the client signal Sb is not input. The CPU 10 is an example of a detecting unit and a detector.

According to the detection result of the inputs of the client signals Sa and Sb, the CPU 10 controls the coupling state of the switch circuit 16. The CPU 10 controls the switch circuit 16 to couple the port a to the port c and the port d such that the bit string Da of the input client signal Sa is output, instead of the client signal Sb that is not input. In this case, the port b is not coupled to any one of the ports a, c, and d.

This coupling state is called a "multi" state. The bit string Da is output from both of the port c and the port d to the DSP 17. Although the frame processing circuit 15 outputs the bit string Db of a random value, the bit string Db is not output from the port d to any one of the ports a, c, and d.

Thus, the switch circuit 16 outputs the same bit string Da from the different ports c and d to the mapping unit 170. The mapping unit 170 maps the bit strings Da for 4 bits (=2 bits×2) to symbols and generates symbol information pieces I/Q according to the symbols.

Because the two bit strings Da input simultaneously from the ports c and d to the mapping unit 170 are obtained from the same client signal Sa, the values of the two bit strings Da are identical.

Figure 5:
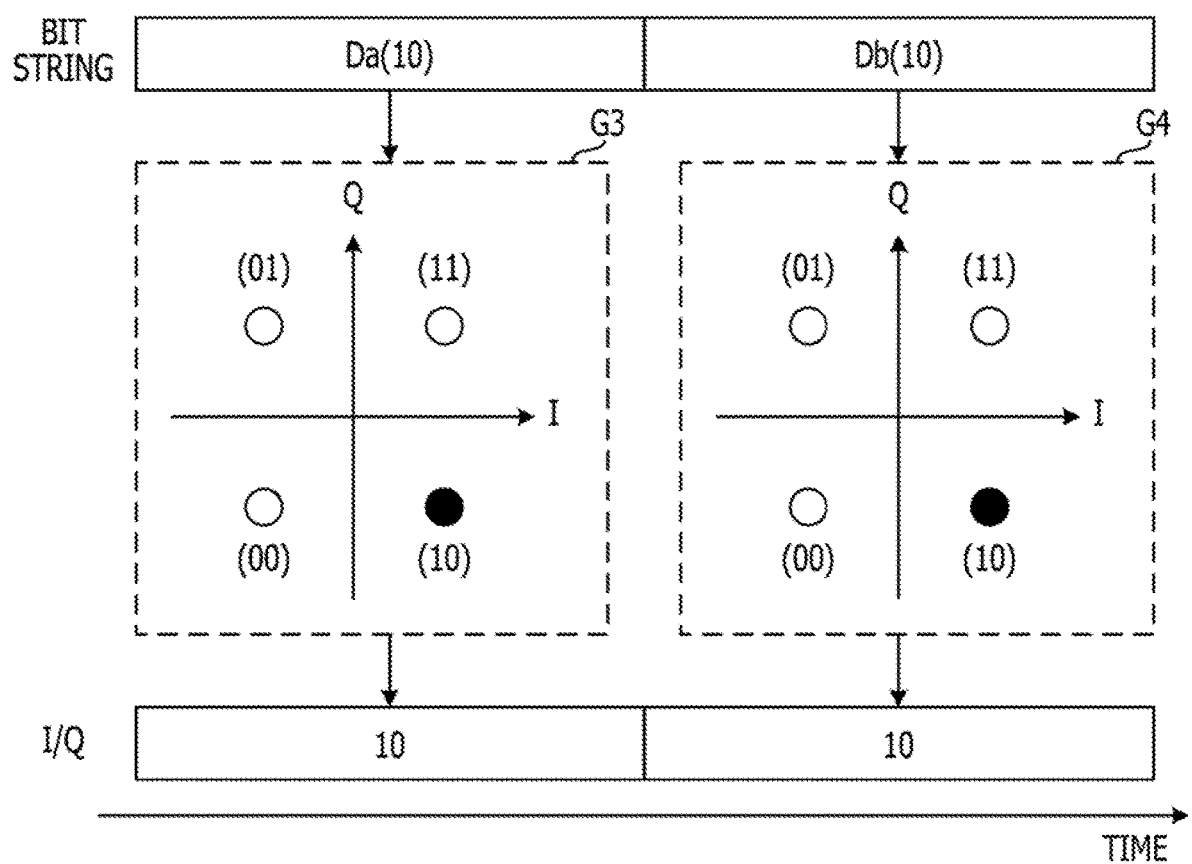
FIG. 5 is a diagram illustrating an example of processing for allocating symbols to bit strings having an identical value.

FIG. 5 is a diagram illustrating an example of processing for allocating symbols to the bit strings Da having an identical value. FIG. 5 illustrates how symbols are sequentially allocated to the two bit strings Da to generate symbol information pieces I/Q in a time axis.

First, the mapping unit 170 allocates a QPSK symbol (10) according to the value "10" of the bit string Da from the port c (see Reference G3) and generates a symbol information piece I/Q according to the allocated symbol (10). Next, the mapping unit 170 allocates a QPSK symbol (10) according to the value "10" of the bit string Da from the port d (see Reference G4) and generates a symbol information piece I/Q according to the allocated symbol (10).

In this manner, the mapping unit 170 serially generates identical symbol information pieces I/Q from the bit strings Da and Db having an identical value. The optical modulator 19 performs optical modulation by controlling the phase and amplitude of light from the laser diode 18 based on the symbol information pieces I/Q. For that, the modulation rate of the optical modulator 19 is equal to the rate at which one symbol is generated for 4-bit bit strings Da. In other words, for example, the modulation rate is half of the case illustrated in FIG. 3.

The CPU 10 detects inputs of the client signals Sa and Sb based on the implementation signal and the operation information from the interface circuit 14. If both of the client signals Sa and Sb are input, the CPU 10 controls the coupling state of the switch circuit 16 to the straight state. If the one client signal Sb is not input, the CPU 10 controls the coupling state of the switch circuit 16 to the multi state.

Having described the example in the case where the client signal Sb is not input, the CPU 10 controls the coupling state of the switch circuit 16 to the multi state also in a case where the client. IF module 14a, for example, is not implemented and has a non-operating state and the client signal Sa is not input. In a case where the client IF modules 14a and 14b are not implemented and have a non-operating state and both of the client signals Sa and Sb are not input, the CPU 10 controls the coupling state of the switch circuit 16 to the multi state. The processing for controlling the coupling state of the switch circuit 16 will be described below.

Figure 6:
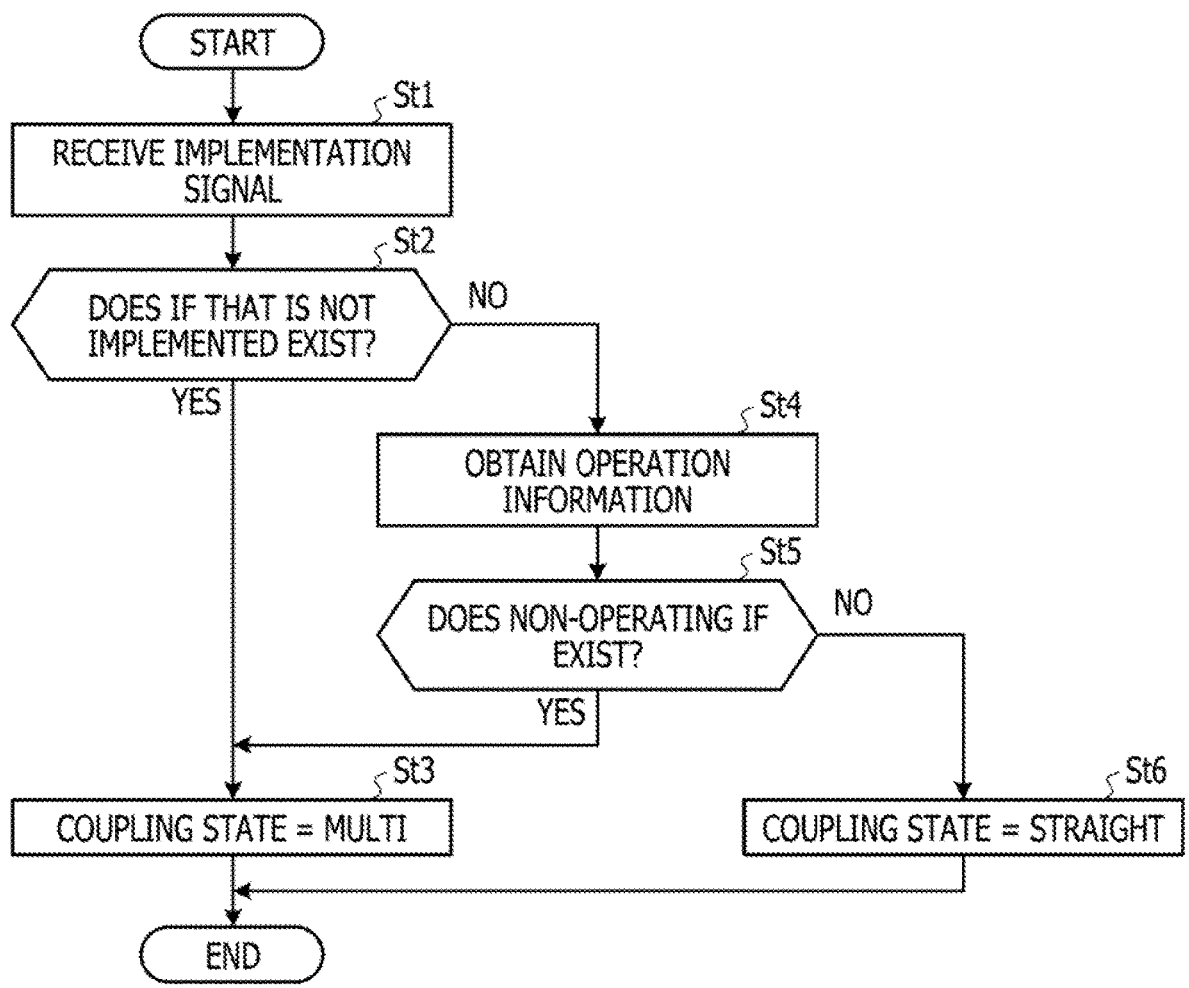
FIG. 6 is a flowchart illustrating an example of processing for controlling a coupling state of a switch circuit.

FIG. 6 is a flowchart illustrating an example of processing for controlling a coupling state of the switch circuit 16. This processing is an example of a transmitting method and, for example, is repeatedly executed at predetermined cycles.

The CPU 10 receives an implementation signal from the interface circuit 14 (step St1). Next, the CPU 10 determines whether each of the client IF modules 14a and 14b is implemented or not based on the implementation signal (step St2).

If at least one of the client IF modules 14a and 14b has a non-implemented state (Yes in step St2), the CPU 10 determines that at least one of the client signals Sa and Sb is not input and controls the coupling state of the switch circuit 16 to the multi state (step St3). In this case, the switch circuit 16 selects two bit strings Da as bit strings output from the ports c and d.

If all of the client IF modules 14a and 14b are implemented (No in step St2), the CPU 10 obtains operation information from the interface circuit 14 (step St4). Next, the CPU 10 determines whether the client IF modules 14a and 14b being implemented have an operating state or not based on the operation information (step St5).

If at least one of the client IF modules 14a and 14b has a non-operating state (Yes in step St5), the CPU 10 determines that at least one of the client signals Sa and Sb is not input and controls the coupling state of the switch circuit 16 to the multi state (step St3).

If all of the client IF modules 14a and 14b have a non-operating state (No in step St5), the CPU 10 determines that the client signals Sa and Sb are not input and controls the coupling state of the switch circuit 16 to the straight state (step St6). In this case, the switch circuit 16 selects the bit strings Da and Db as bit strings output from the ports c and d.

In this manner, the switch circuit 16 selects the bit strings Da and Db based on the detection result of inputs of the client signals Sa and Sb by the CPU 10. If the inputs of the client signals Sa and Sb are detected, the switch circuit 16 selects the bit strings Da and Db included in the client signals Sa and Sb. If the input of the client signal Sb is not detected, the switch circuit 16 selects the bit string included in the client signal Sa the input of which is detected instead of the client signal Sb the input of which is not detected such that identical symbol information pieces I/Q are serially generated in predetermined order.

Thus, the modulation rate of the optical modulator 19 in the case where the input of the client signal Sb is not detected is lower than the case where the inputs of the client signals Sa and Sb are detected, as described above. Therefore, the width of the frequency band occupied by the optical signal So (hereinafter, "occupied band width") is reduced, as will be described below.

Figure 7:
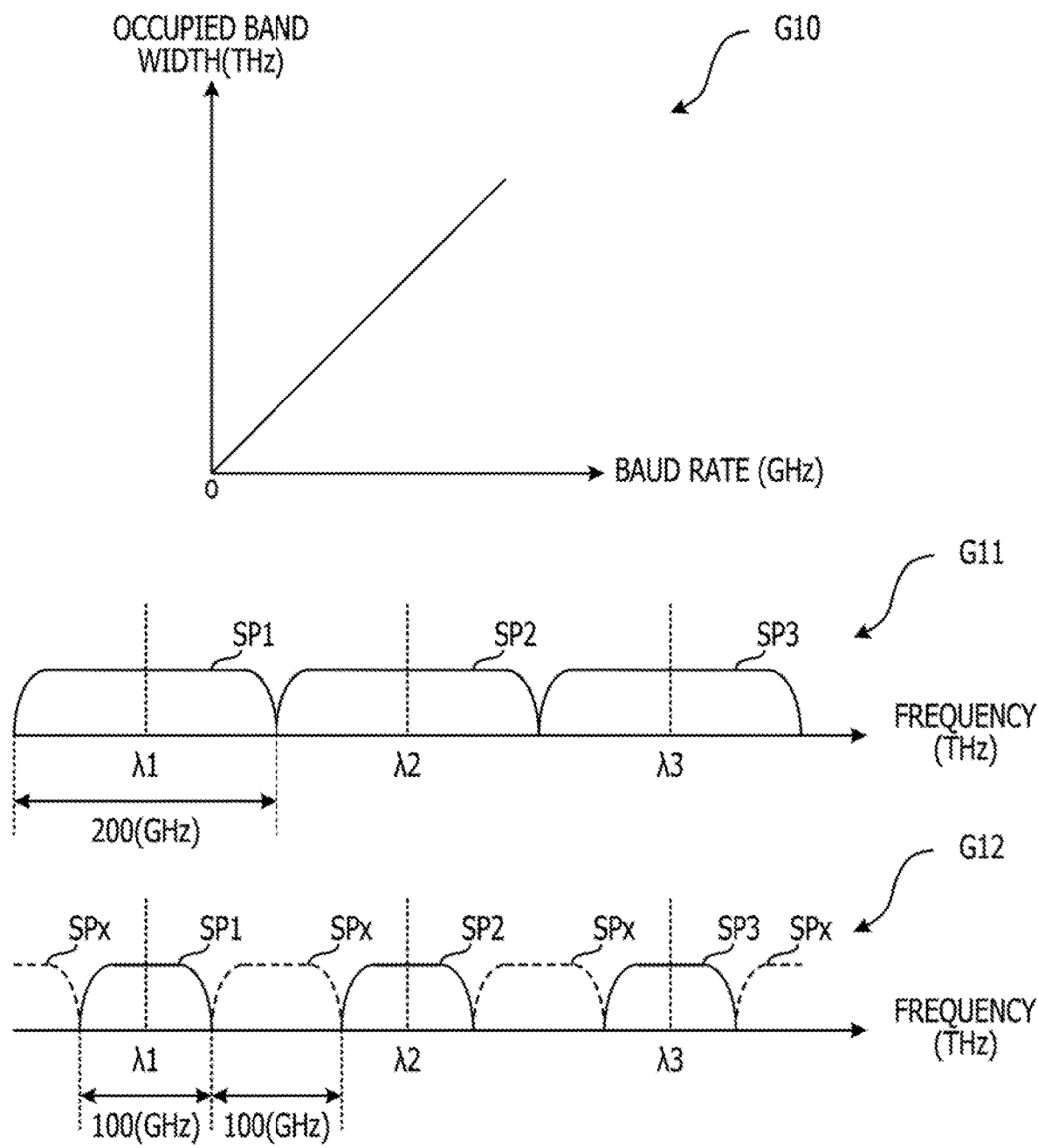
FIG. 7 is a diagram illustrating an example of reduction of a width of a frequency band occupied by an optical signal.

FIG. 7 is a diagram illustrating an example of the reduction of the occupied band width. Reference G10 indicates an example of a relationship of the occupied band width (THz) against baud rate (GHz). The occupied band width is in proportion to a baud rate that is a modulation rate. As the modulation rate decreases, the occupied band width decreases.

Reference G11 indicates spectrum waveforms of the wavelength multiplexed optical signal Sm and indicates examples of frequency bands SP1 to SP3 of optical signals So having wavelengths λ1 to λ3 when the coupling state of the switch circuit 16 is the straight state. The optical signals So having the wavelengths λ1 to λ3 occupy a frequency band of 200 (GHz) as an example. Also when the mapping unit 170 allocates a symbol to the bit string Db of a random value, the optical signals So having wavelengths λ1 to λ3 occupy a frequency band of 200 (GHz).

Reference G12 indicates spectrum waveforms of the wavelength multiplexed optical signal Sm and indicates examples of frequency bands SP1 to SP3 of optical signals So having wavelengths λ1 to λ3 when the coupling state of the switch circuit 16 is the multi state. The modulation rate of the optical modulator 19 is half of the case where the coupling state of the switch circuit 16 is the straight state because identical symbol information pieces I/Q for two symbols are input to the optical modulator 19 in a case where the coupling state of the switch circuit 16 is the multi state.

For that, the optical signals So having the wavelengths λ1 to λ3 occupy a frequency band of 100 (GHz)(=200/2) as an example. In other words, for example, the occupied band width is half of the case indicated by Reference G11. Therefore, the waste of the occupied band width due to the bit string Db of a random value may be suppressed.

A vacant band SPx of 100 (GHz) occurs between the frequency bands SP1 to SP3. Thus, the wavelength multiplexing apparatus 91 allocates an optical signal of another transmitter 1 to the vacant band SPx to increase the transmission efficiency.

The transmitter 1 of this embodiment changes the selection of the bit strings Da and Db output from the switch circuit 16 to the mapping unit 170 so that the modulation rate of the optical modulator 19 is reduced and that the waste of the frequency band may be suppressed. Thus, the interruption time of communication is reduced compared with a case where the DSP 17 is re-started, for example.

The switch circuit 16 outputs the bit strings Da and Db from the ports c and d to the mapping unit 170. If the input of the one client signal Sb is not detected, the switch circuit 16 outputs the bit string Da included in the client signals Sa the input of which is detected to the two ports c and d.

Thus, the switch circuit 16 may output the bit strings Da and Db from the plurality of ports c and d in parallel to the mapping unit 170. Therefore, the transmission times of the bit strings Da and Db are reduced.

The CPU 10 detects inputs of the client signals Sa and Sb by determining whether the client. IF modules 14a and 14b, which are input sources of the client signals Sa and Sb, are implemented in the transmitter 1 or not. Therefore, the CPU 10 may detect inputs of the client signals Sa and Sb based on the implementation states of the client IF modules 14a and 14b.

The CPU 10 detects inputs of the client signals Sa and Sb by determining whether the client IF modules 14a and 14b, which are input sources of the client signals Sa and Sb, have an operating state or not. Therefore, the CPU 10 may detect inputs of the client signals Sa and Sb based on the operating states of the client IF modules 14a and 14b.

Second Embodiment

Figure 8:
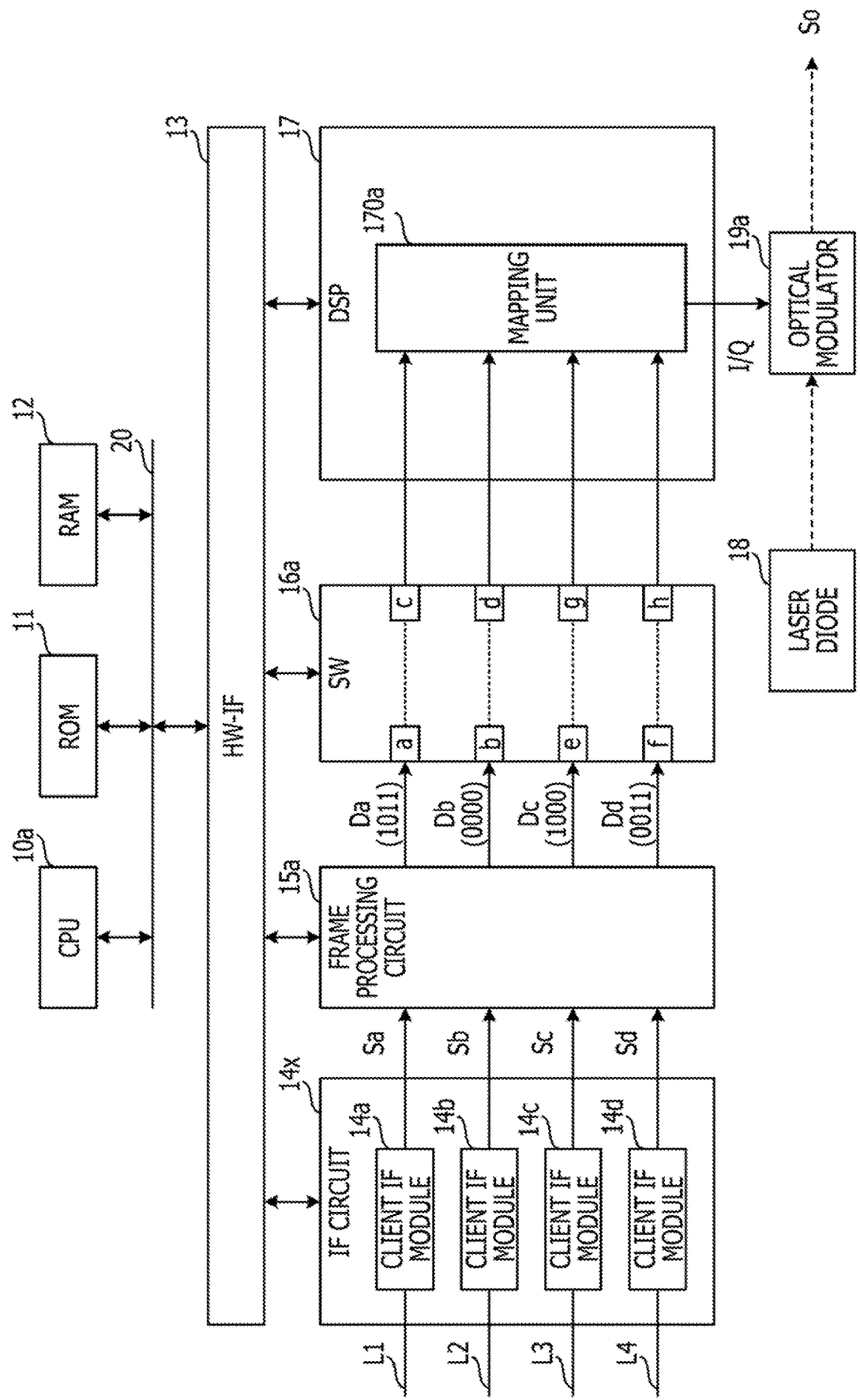
FIG. 8 is a configuration diagram illustrating a transmitter of a second embodiment.

FIG. 8 is a configuration diagram illustrating a transmitter 1 of a second embodiment. In FIG. 8, constituents common to those in FIG. 2 are denoted by the same reference numerals, and description thereof is omitted. The transmitter 1 of this embodiment applies 16 quadrature amplitude modulation (QAM) instead of QPSK as a multiple modulation method.

The transmitter 1 has a CPU 10a, a ROM 11, a RAM 12, and an HW-IF 13. The CPU 10a is coupled to the ROM 11, the RAM 12, and the HW-IF 13 through a bus 20 so as to enable mutual inputting/outputting of signals.

The transmitter 1 further has an interface circuit 14x, a frame processing circuit 15a, a switch circuit 16a, a DSP 17, a laser diode 18, and an optical modulator 19a. The interface circuit 14x, the frame processing circuit 15a, the switch circuit 16a, and the DSP 17 are coupled to the bus 20 via the HW-IF 13. The interface circuit 14x and the frame processing circuit 15a are circuits configured by hardware such as an FPGA or an ASIC.

The interface circuit 14x is coupled to four client IF modules 14a to 14d the number of which is higher than those coupled to the interface circuit 14 of the first embodiment. The client IF modules 14a to 14d are coupled to client lines L1 to L4, respectively.

The client IF modules 14a to 14d are not functionally different. The client IF module 14c receives a client signal Sc from the client line 13 and outputs it to the frame processing circuit 15a. The client IF module 14d receives a client signal Sd from the client line L4 and outputs it to the frame processing circuit 15a. FIG. 8 illustrates a state that all of the four client IF modules 14a to 14d are implemented in the interface circuit 14x.

The interface circuit 14x has the same functionality as that of the interface circuit 14 of the first embodiment. The interface circuit 14x outputs, for example, an implementation signal indicating whether the client IF modules 14a to 14d are implemented or not to the CPU 10a via the HW-IF 13. The CPU 10a determines whether each of the client IF modules 14a to 14d is implemented in the transmitter 1 or not based on the implementation signal.

The interface circuit 14x reads out operation information from each of the client IF modules 14a to 14d and outputs it to the CPU 10a via the HW-IF 13. Based on the operation information, the CPU 10a determines whether the client IF modules 14a to 14d have an operating state or not. If the client IF modules 14a to 14d have an operating state, the client IF modules 14a to 14d transmit and receive client signals Sa to Sd, respectively. If the client IF modules 14a to 14d have a non-operating state, the transmission and reception of the client signals Sa to Sd are stopped.

The frame processing circuit 15a extracts data from the client signals Sa to Sd and outputs them to the switch circuit 16a as bit strings Da to Dd. For example, the frame processing circuit 15a converts data included in a payload of the client signal Sa to a binary bit string Da and converts data included in a payload of the client signal Sb to a binary bit string Db. The frame processing circuit 15a converts data included in a payload of the client signal Sc to a binary bit string Dc and converts data included in a payload of the client signal Sd to a binary bit string Dd.

When the client signals Sa to Sd are not input, the frame processing circuit 15a outputs bit strings Da to Dd of random values to the switch circuit 16a.

The switch circuit 16a is an electric switch including a configuration having 4×4 ports that are more than the ports in the switch circuit 16 of the first embodiment. The switch circuit 16a has ports a to h. The ports a, b, e, and f are input ports to which the bit strings Da to Dd are input, and the ports c, d, g, and h are output ports from which the bit strings Da to Dd are output. The switch circuit 16a is an example of a selecting unit and a selector.

FIG. 8 illustrates a state in which the port a and the port c are coupled, the port b and the port d are coupled, the port e and the port g are coupled, and the port f and the port h are coupled. Hereinafter, this coupling state is called a "straight" state. The bit string Da is output from the port c to the DSP 17, and the bit string Db is output from the port d to the DSP 17. The bit string Dc is output from the port g to the DSP 17, and the bit string Dd is output from the port h to the DSP 17.

The DSP 17 has a mapping unit 170a that allocates symbols within a 16QAM constellation to the bit strings Da to Dd. 16QAM is an example of multilevel modulation.

The mapping unit 170a maps the bit strings Da to Dd to symbols in predetermined order for each number of bits (4 bits) according to the multivalued degree (4) of 16QAM and generates symbol information pieces I/Q according to the symbols. Thus, the frame processing circuit 15a outputs the bit strings Da to Dd in units of 4 bits. The mapping unit 170a is an example of a generating unit and a generator.

For example, the bit string Da has a value of "1011", and the bit string Db has a value of "0000". The bit string Dc has a value of "1000", and the bit string Dd has a value of "0011". The mapping unit 170a maps the bit string Da input from the port c, the bit string Db input from the port d, the bit string Dc input from the port g, and the bit string Dd input from the port h to symbols in this order.

The mapping unit 170a outputs the symbol information pieces I/Q according to the values of the bit strings Da to Dd to the optical modulator 19a. The laser diode 18 outputs light having the wavelengths λ1 to λn as its center wavelength to the optical modulator 19a.

The optical modulator 19a is a Mach-Zehnder modulator, for example, and modulates the light from the laser diode 18 in accordance with the symbol information based on QPSK. Thus, the optical modulator 19a generates and outputs optical signals So having wavelengths λ1 to λn. The optical modulator 19a is an example of a modulating unit.

Because the bit strings Da to Dd are acquired from different client signals Sa to Sd, respectively, the values of the bit strings Da to Dd simultaneously input to the mapping unit 170a may be different.

Figure 9:
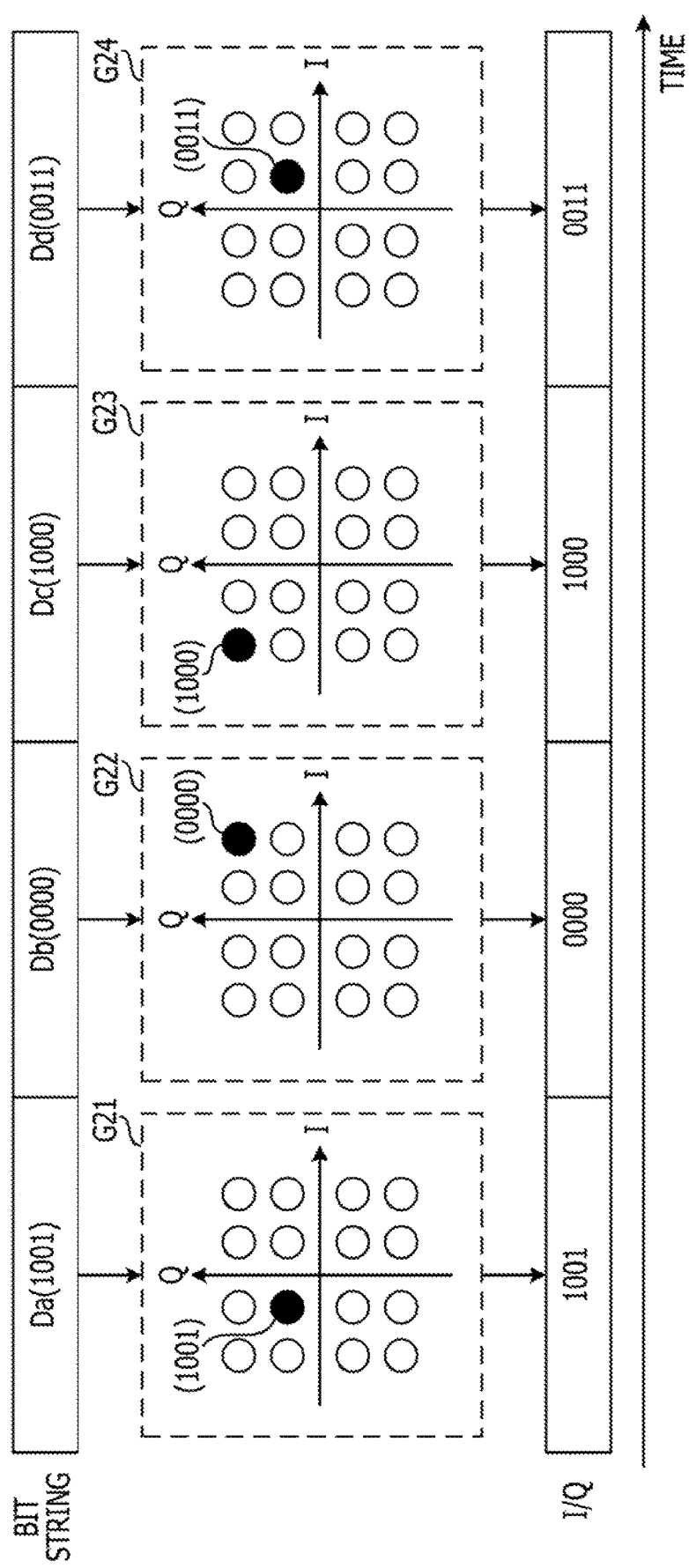
FIG. 9 is a diagram illustrating another example of processing for allocating symbols to bit strings having different values.

FIG. 9 is a diagram illustrating another example of processing for allocating symbols to the bit strings Da to Dd having different values. FIG. 9 illustrates how symbols are sequentially allocated to the bit strings Da to Dd to generate symbol information pieces I/Q in a time axis.

First, the mapping unit 170a allocates a 16QAM symbol (1001) according to the value "1001" of the bit string Da (see Reference G21) and generates a symbol information piece I/Q according to the allocated symbol (1001). Next, the mapping unit 170a allocates a 16QAM symbol (0000) according to the value "0000" of the bit string Db (see Reference G22) and generates a symbol information piece I/Q according to the allocated symbol (0000).

Next, the mapping unit 170a allocates a 16QAM symbol (1000) according to the value "1000" of the bit string Dc (see Reference G23) and generates a symbol information piece I/Q according to the allocated symbol (1000). Next, the mapping unit 170a allocates a 16QAM symbol (0011) according to the value "0011" of the bit string Dd (see Reference G24) and generates a symbol information piece I/Q according to the allocated symbol (0011).

In this manner, the mapping unit 170a serially generates different symbol information pieces I/Q for four symbols from the bit strings Da to Dd having different values. The optical modulator 19a performs optical modulation by controlling the phase and amplitude of light from the laser diode 18 based on the symbol information pieces I/Q. For that, the modulation rate of the optical modulator 19a is equal to the rate at which one symbol is generated for each of the 4-bit bit strings Da, Db, Dc, and Dd.

Having described the example in which all of the client IF modules 14a to 14d are implemented in the transmitter 1 according to this embodiment, an operation in a case where three client IF modules 14b to 14c are not implemented will be described below. When the client IF modules 14b to 14c are not implemented, the frame processing circuit 15a outputs bit strings Db to Dd of random values as dummy data. If the mapping unit 170a allocates symbols to the bit strings Db to Dd of random values, the bands occupied by the bit strings Db to Dd of the random values in the frequency bands of the optical signals So do not contribute to effective data transmission and is wasteful.

Accordingly, the switch circuit 16a switches the couplings between the ports a, b, e, and f and the ports c, d, g, and h such that the bit string Da of the client signal Sa from the client IF module 14a being implemented is output to the mapping unit 170a instead of the client signals Sb to Sd from the client IF modules 14b to 14d not being implemented.

Figure 10:
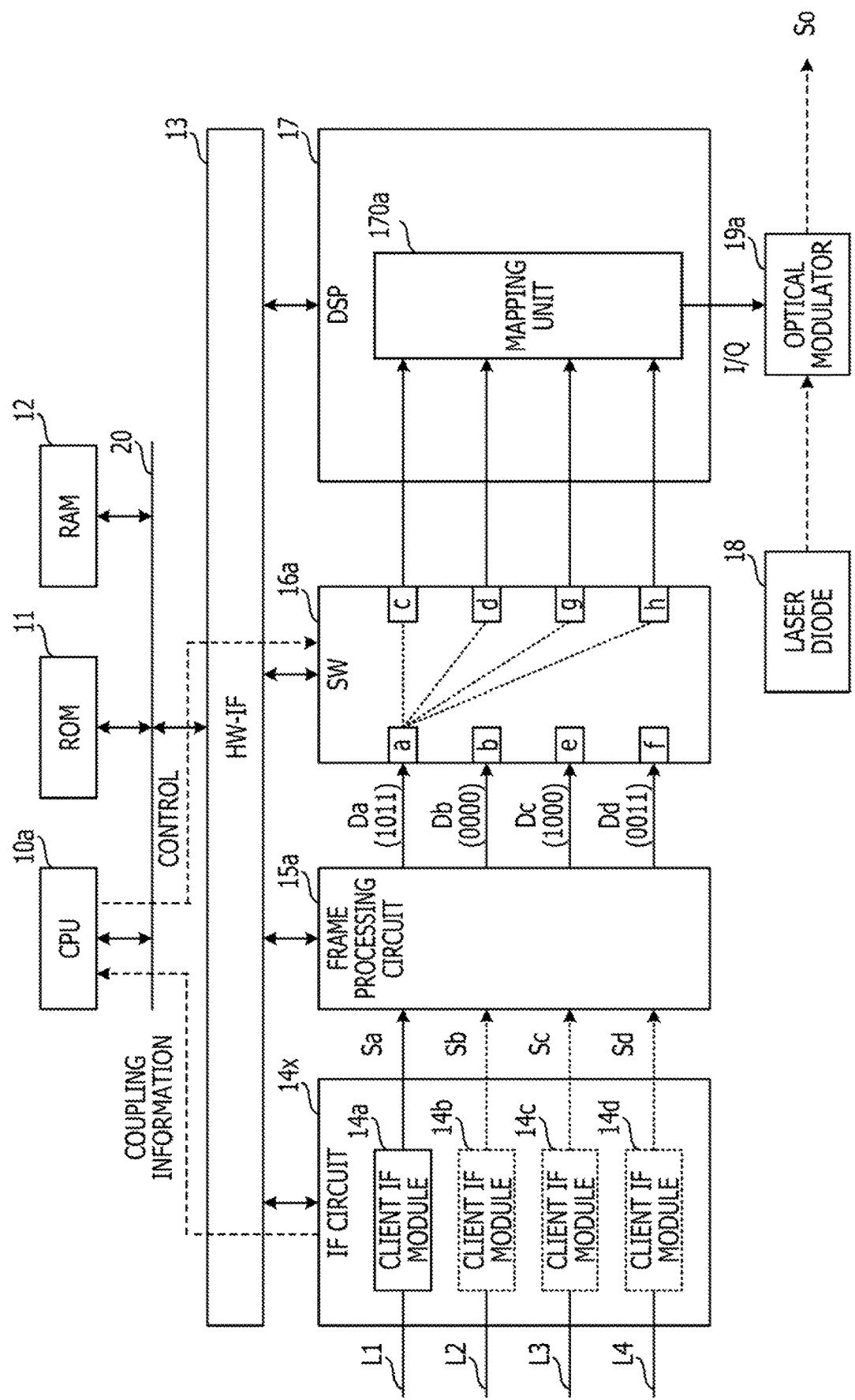
FIG. 10 is a diagram illustrating an example of an operation of a transmitter in a case where three client interface modules are not implemented.

FIG. 10 is a diagram illustrating an example of an operation by the transmitter 1 in a case where three client IF modules 14b to 14d are not implemented. In FIG. 10, constituents common to those in FIG. 8 are denoted by the same reference numerals, and description thereof is omitted.

The interface circuit 14x outputs to the CPU 10a coupling information indicating that the client IF module 14a is coupled and the client IF modules 14b to 14d are not coupled. Based on the coupling information, the CPU 10a detects that the client signal Sa is input and the client signals Sb to Sd are not input. When the client IF modules 14b to 14d have a non-operating state, the CPU 10a detects that the client signals Sb to Sd are not input based on the operation information. The CPU 10a is an example of a detecting unit and a detector.

According to the detection result of the inputs of the client signals Sa to Sd, the CPU 10a controls the coupling state of the switch circuit 16a. The CPU 10a controls the switch circuit 16a to couple the port a to the port c, the port d, the port g and the port h such that the bit string Da of the input client signal Sa is output, instead of the client signals Sb to Sd that are not input. In this case, the ports b, e, and f are not coupled to any one of the ports a, c, d, g and h.

This coupling state is called a "multi" state. The bit string Da is output from the four ports c, d, g, and h to the DSP 17. Although the frame processing circuit 15a outputs the bit strings Db to Dd of random values, the bit string Db to Dd are not output from the ports b, e, and f to any one of the ports c, d, g, and h.

Thus, the switch circuit 16a outputs the same bit strings Da from the different ports c, d, g and h to the mapping unit 170a. The mapping unit 170a maps the bit strings Da for 16 bits (=4 bits×4) to symbols and generates symbol information pieces I/Q according to the symbols.

Because the four bit strings Da input simultaneously from the ports c, d, g and h to the mapping unit 170a are obtained from the same client signal Sa, the values of the four bit strings Da are identical.

Figure 11:
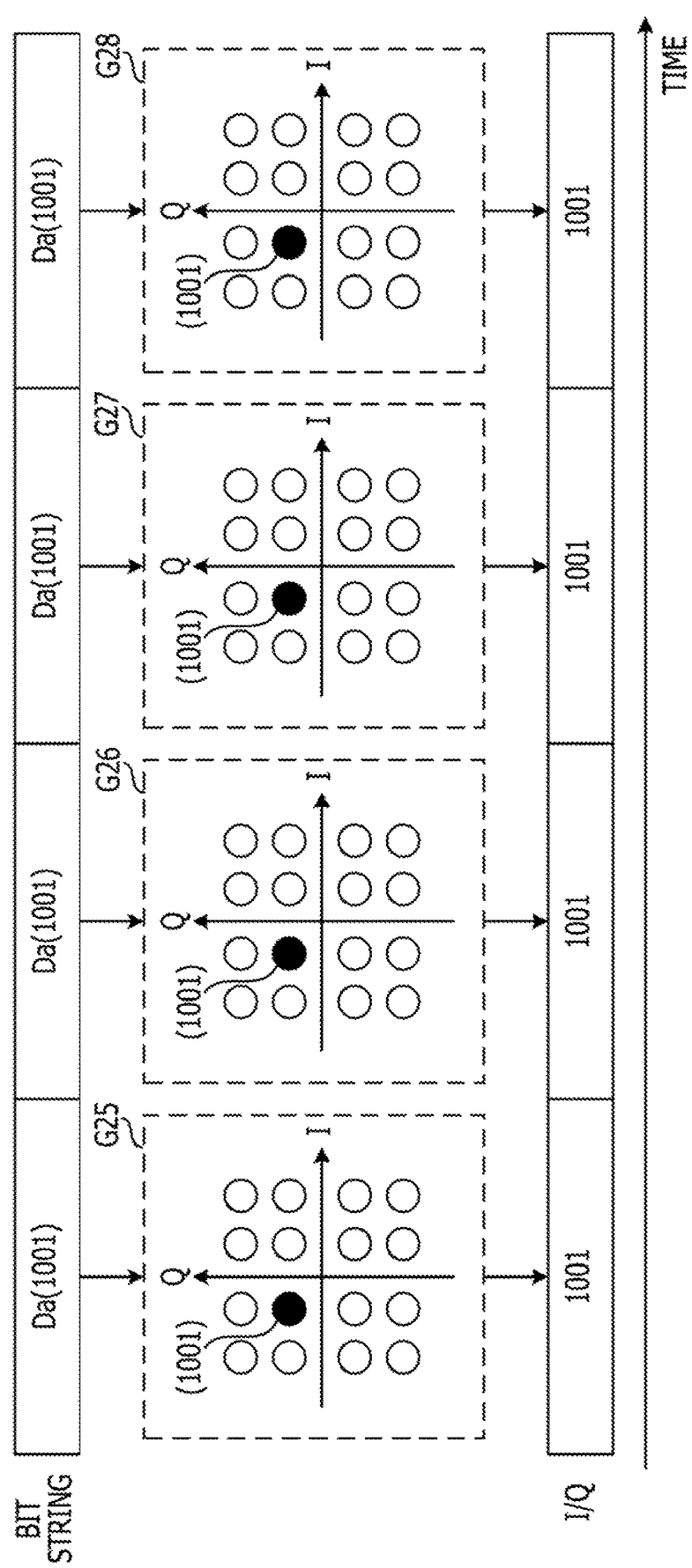
FIG. 11 is a diagram illustrating an example of processing for allocating symbols to bit strings having an identical value.

FIG. 11 is a diagram illustrating an example of processing for allocating symbols to the bit strings Da having an identical value. FIG. 11 illustrates how symbols are sequentially allocated to the four bit strings Da to generate symbol information pieces I/Q in a time axis.

First, the mapping unit 170a allocates a QPSK symbol (1001) according to the value "1001" of the bit string Da from the port c (see Reference G25) and generates a symbol information piece I/Q according to the allocated symbol (1001). Next, the mapping unit 170a allocates a QPSK symbol (1001) according to the value "1001" of the bit string Da from the port d (see Reference G26) and generates a symbol information piece I/Q according to the allocated symbol (1001).

Next, the mapping unit 170a allocates a QPSK symbol (1001) according to the value "1001" of the bit string Da from the port g (see Reference G27) and generates a symbol information piece I/Q according to the allocated symbol (1001). Next, the mapping unit 170a allocates a QPSK symbol (1001) according to the value "1001" of the bit string Da from the port h (see Reference G28) and generates a symbol information piece I/Q according to the allocated symbol (1001).

In this manner, the mapping unit 170a serially generates identical symbol information pieces I/Q for four symbols from the bit strings Da to Dd having an identical value. The optical modulator 19a performs optical modulation by controlling the phase and amplitude of light from the laser diode 18 based on the symbol information pieces I/Q. For that, the modulation rate of the optical modulator 19a is equal to the rate at which one symbol is generated for the 16-bit bit string Da. In other words, for example, the modulation rate is ¼ of the case illustrated in FIG. 9.

The CPU 10a detects inputs of the client signals Sa to Sd based on the implementation signal and the operation information from the interface circuit 14x. If all of the client signals Sa to Sd are input, the CPU 10a controls the coupling state of the switch circuit 16a to the straight state. If the client signals Sb to Sd are not input, the CPU 10a controls the coupling state of the switch circuit 16a to the multi state. The control processing over the coupling state of the switch circuit 16a is as described with reference to FIG. 6.

In this manner, the switch circuit 16a selects the bit strings Da to Dd based on the detection result of inputs of the client signals Sa to Sd by the CPU 10a. If the inputs of the client signals Sa to Sd are detected, the switch circuit 16a selects the bit strings Da to Dd included in the client signals Sa to Sd. If the inputs of the client signals Sb to Sd are not detected, the switch circuit 16a selects the bit string included in the client signal Sa the input of which is detected instead of the client signals Sb to Sd the inputs of which are not detected such that identical symbol information pieces I/Q are serially generated in predetermined order.

Thus, the modulation rate of the optical modulator 19a in the case where the inputs of the client signals Sb to Sd are not detected is lower than the case where the inputs of the client signals Sa to Sd are detected, as described above. Therefore, the occupied band width of the optical signal S is reduced, as will be described below.

Figure 12:
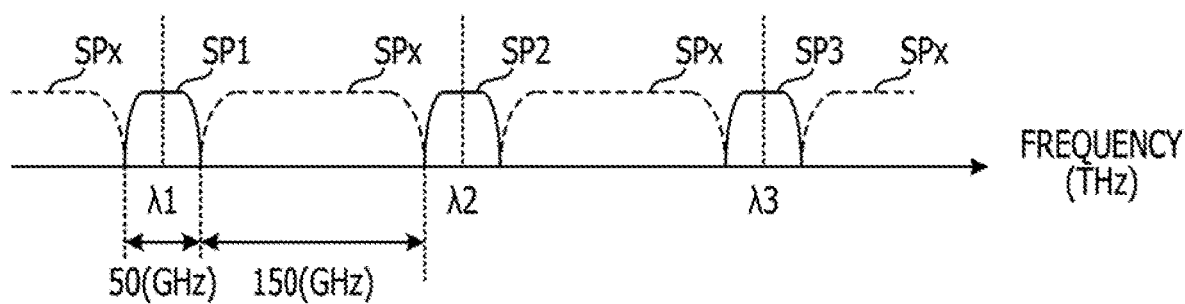
FIG. 12 is a diagram illustrating another example of reduction of a width of a frequency band occupied by an optical signal.

FIG. 12 is a diagram illustrating another example of the reduction of the occupied band width. As described above, the modulation rate of the optical modulator 19a in the case where the inputs of the client signals Sb to Sd are not detected is ¼ of the case where the inputs of the client signals Sa to Sd are detected. Therefore, the width of the frequency bands SP1 to SP3 of the optical signals So having the wavelengths λ1 to λ3 is 50 (GHz) that is equal to ¼ of 200 (GHz).

A vacant band SPx of 150 (GHz) occurs between the frequency bands SP1 to SP3. Thus, the wavelength multiplexing apparatus 91 allocates an optical signal of another transmitter 1 to the vacant band SPx to increase the transmission efficiency.

Having described the case where the inputs of the client signals Sb to Sd are not detected according to this embodiment, embodiments are not limited thereto. For example, when the client signals Sa to Sc are not input, the switch circuit 16a has the multi state in which the bit string Dd of the client signal Sd the input of which is detected is output from the ports c, d, g, and h so that four bit strings Dd having an identical value may be output to the mapping unit 170a.

An operation in a case where inputs of two client signals Sb and Sd are not detected will be described below. Although a case where the client signals Sb and Sd are not input because the client IF modules 14b and 14d are not implemented will be described as an example, the same control over the switch circuit 16a is performed also in a case where the client IF modules 14b and 14d have a non-operating state.

Figure 13:
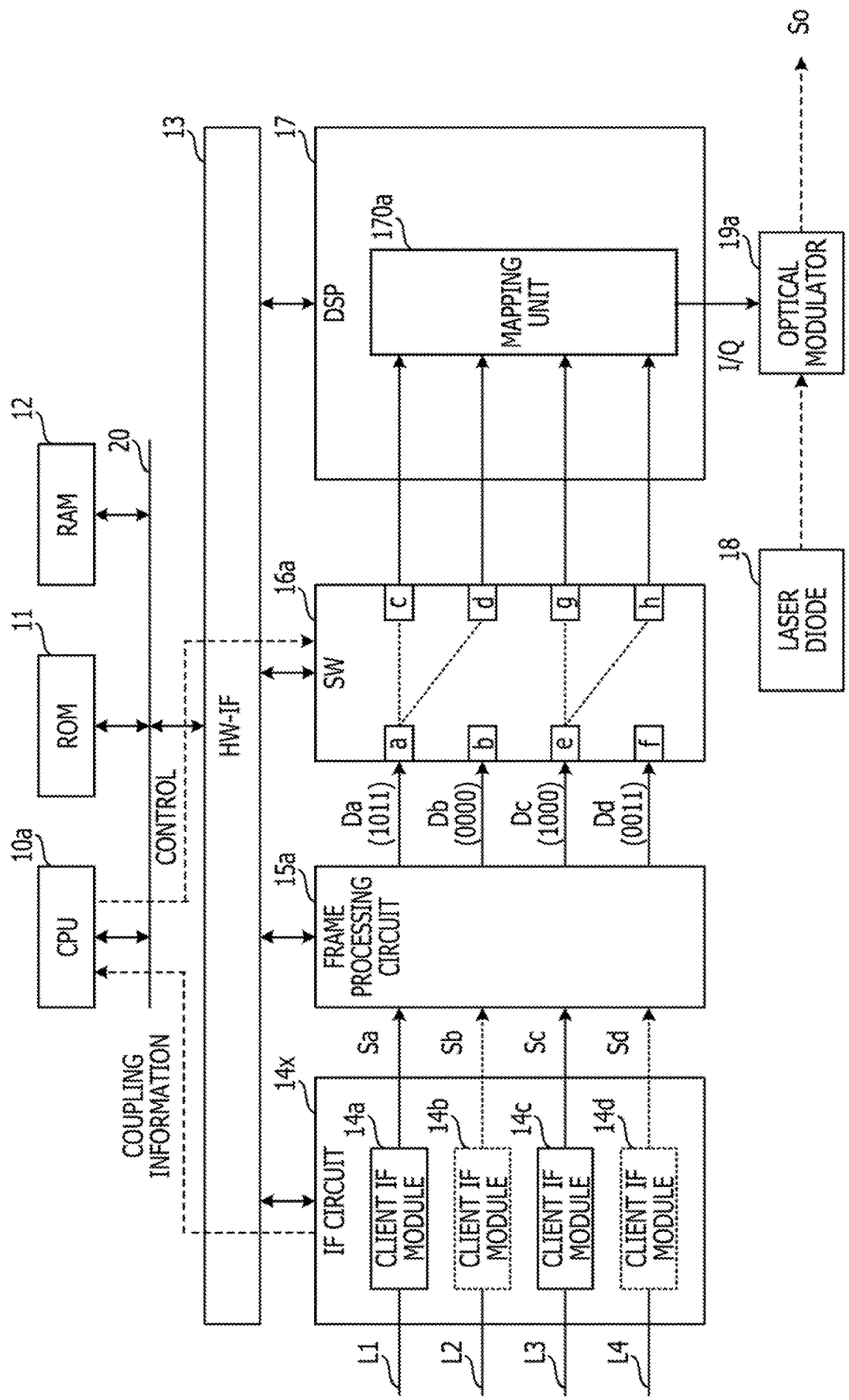
FIG. 13 is a diagram illustrating an example of an operation of a transmitter in a case where two client interface modules are not implemented.

FIG. 13 is a diagram illustrating an example of an operation by the transmitter 1 in a case where two client IF modules 14b and 14d are not implemented. In FIG. 13, constituents common to those in FIG. 10 are denoted by the same reference numerals, and description thereof is omitted.

The interface circuit 14x outputs to the CPU 10a coupling information indicating that the client IF modules 14a and 14c are coupled and the client IF modules 14b and 14d are not coupled. Based on the coupling information, the CPU 10a detects that the client signals Sa and Sc are input and the client signals Sb and Sd are not input. When the client IF modules 14b and 14d have a non-operating state, the CPU 10a detects that the client signals Sb and Sd are not input based on the operation information.

According to the detection result of the inputs of the client signals Sa to Sd, the CPU 10a controls the coupling state of the switch circuit 16a. The CPU 10a controls the switch circuit 16a to couple the port a to the port c and the port d such that the bit string Da of the input client signal Sa is output, instead of the client signal Sb that is not input.

The CPU 10a controls the switch circuit 16a to couple the port e to the port g and the port h such that the bit string Dc of the input client signal Sc is output, instead of the client signal Sd that is not input. In this case, the ports b and f are not coupled to any one of the ports a, c, d, g, and h.

This coupling state is called a "double-multi" state. The bit string Da is output from the two ports c and d to the DSP 17, and the bit string Dc is output from the two ports g and h to the DSP 17. Although the frame processing circuit 15a outputs the bit strings Db and Dd of random values, the bit strings Db and Dd are not output from the ports b and f to any one of the ports c, d, g, and h.

Thus, the switch circuit 16a outputs the identical bit string Da from the different ports c and d to the mapping unit 170a and outputs the identical bit string Dc from the different ports g and h to the mapping unit 170a. The mapping unit 170a maps the bit strings Da for 8 bits (=4 bits×2) and the bit strings Dc for 8 bits (=4 bits×2) to symbols and generates symbol information pieces I/Q according to the symbols.

Because the two bit strings Da input simultaneously from the ports c and d to the mapping unit 170a are obtained from the identical client signal Sa, the values of the two bit strings Da are identical. Because the two bit strings Dc input simultaneously from the ports g and h to the mapping unit 170a are obtained from the same client signal Sc, the values of the two bit strings Dc are identical.

Figure 14:
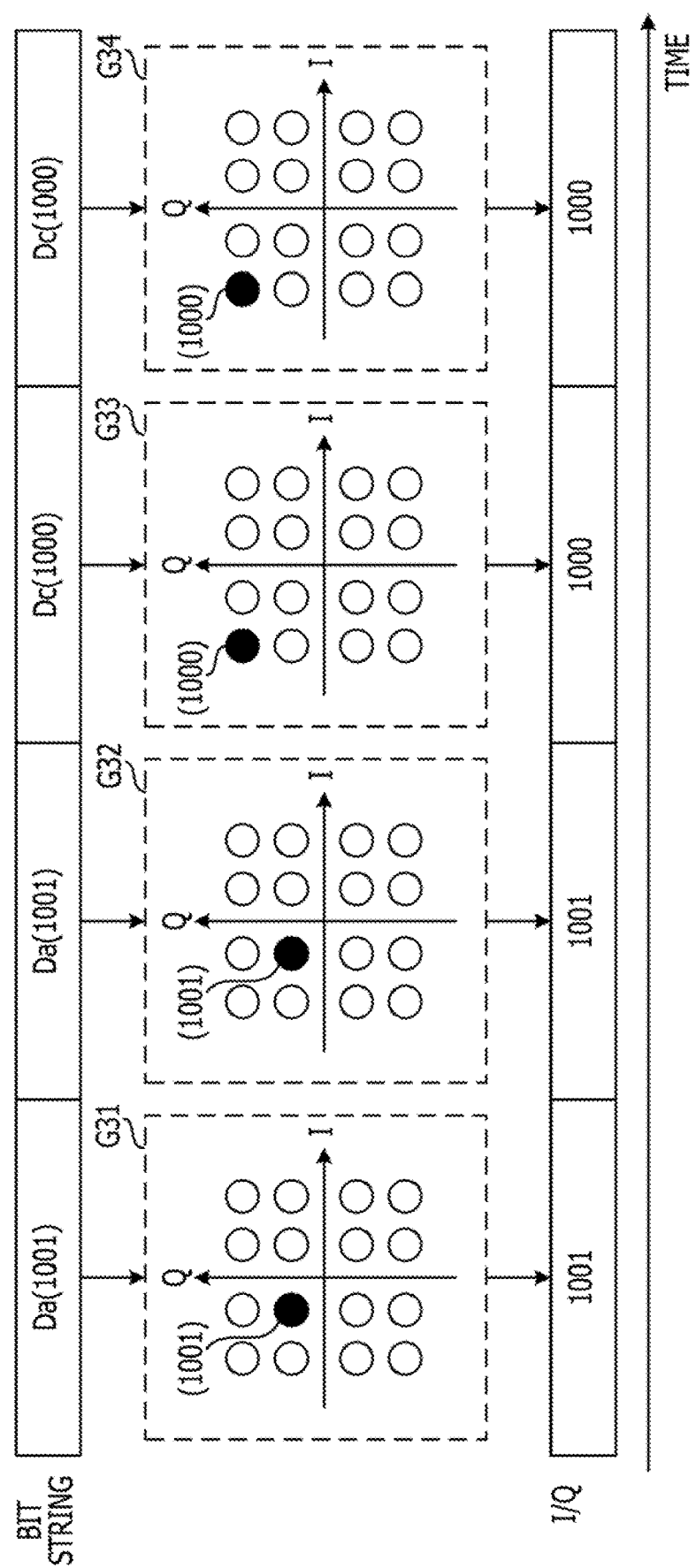
FIG. 14 is a diagram illustrating an example of processing for allocating symbols to two pairs of bit strings having an identical value.

FIG. 14 is a diagram illustrating an example of processing for allocating symbols to the two pairs of bit strings Da and Dc each having an identical value. FIG. 14 illustrates how symbols are sequentially allocated to the two pairs of bit strings Da and Dc to generate symbol information pieces I/Q in a time axis.

First, the mapping unit 170a allocates a QPSK symbol (1001) according to the value "1001" of the bit string Da from the port c (see Reference G31) and generates a symbol information piece I/Q according to the allocated symbol (1001). Next, the mapping unit 170a allocates a QPSK symbol (1001) according to the value "1001" of the bit string Da from the port d (see Reference G32) and generates a symbol information piece I/Q according to the allocated symbol (1001).

Next, the mapping unit 170a allocates a QPSK symbol (1000) according to the value "1000" of the bit string Dc from the port g (see Reference G33) and generates a symbol information piece I/Q according to the allocated symbol (1000). Next, the mapping unit 170a allocates a QPSK symbol (1000) according to the value "1000" of the bit string Dc from the port h (see Reference G34) and generates a symbol information piece I/Q according to the allocated symbol (1000).

In this manner, the mapping unit 170a serially generates identical symbol information pieces I/Q for two symbols from the two pairs of bit strings Da and Dc having an identical value. The optical modulator 19a performs optical modulation by controlling the phase and amplitude of light from the laser diode 18 based on the symbol information pieces I/Q. For that, the modulation rate of the optical modulator 19a is equal to the rate at which one symbol is generated for the 8-bit bit strings Da and Dc. In other words, for example, the modulation rate is half of the case illustrated in FIG. 9. Therefore, the widths of the frequency bands SP1 to SP3 of the optical signals So are equal to 100 (GHz) as indicated by Reference G12 in FIG. 7.

The CPU 10a detects inputs of the client signals Sa to Sd based on the implementation signal and the operation information from the interface circuit 14x. If all of the client signals Sa to Sd are input, the CPU 10a controls the coupling state of the switch circuit 16a to the straight state. If the client signals Sb and Sd are not input, the CPU 10a controls the coupling state of the switch circuit 16a to the double-multi state.

Unlike this embodiment, when the client signals Sa and Sc are not input, the CPU 10a controls the coupling state of the switch circuit 16a to the double-multi state. Also in this case, the mapping unit 170a serially generates identical symbol information pieces I/Q for two symbols from the two pairs of bit strings Db and Dd having an identical value. Thus, the same effect as that described above may be acquired.

The control processing over the coupling state of the switch circuit 16a is the same as the processing for changing the coupling state to the double-multi state instead of the multi state in step St3 in FIG. 6. For example, if the number of client signals the inputs of which are detected and the number of client signals the inputs of which are not detected are plural and equal, the CPU 10a controls the coupling state to the double-multi state and otherwise controls the coupling state to the multi state in step St3.

In this manner, if the number of client signals the inputs of which are not detected and the number of client signals the inputs of which are detected are plural and equal among the client signals Sa to Sd, the switch circuit 16a individually selects the bit strings Da and Dc included in the client signals Sa and Sc the inputs of which are detected instead of the client signals Sb and Sd the inputs of which are not detected.

Thus, the modulation rate of the optical modulator 19a is half of the case illustrated in FIG. 9, and the waste of the frequency band may be suppressed.

Third Embodiment

According to the first embodiment, in a case where the DSP 17 gives a control bit relating to control over the bit strings Da and Db such as an overhead (OH) and a forward error correction (FEC) to the bit strings Da and Db, different control bits are given to the two bit strings Da when the coupling state of the switch circuit 16 is the multi state. In this case, because the control bits of the two bit strings Da simultaneously input to the mapping unit 170 are different, the frequency bands SP1 to SP3 of the optical signals So are not reduced.

Accordingly, a DSP 17 of this embodiment gives an identical control bit to the two bit strings Da in a case where the coupling state of the switch circuit 16 is the multi state, as will be described below.

FIG. 15 is a configuration diagram illustrating a transmitter 1 of a third embodiment. In FIG. 15, constituents common to those in FIG. 2 are denoted by the same reference numerals, and description thereof is omitted.

The DSP 17 has a mapping unit 170 and an OH/FEC giving unit 171. The OH/FEC giving unit 171 is provided in a previous stage of the mapping unit 170 and gives overhead and FEC control bits to bit strings Da and Db. The OH/FEC giving unit 171 is an example of a giving unit and a giver.

The OH/FEC giving unit 171 has inserting units 171a and 171b each of which inserts overhead and FEC control bits to predetermined positions in the bit strings Da and Db. The OH/FEC giving unit 171 inputs the bit strings Da and Db from ports c and d to the inserting units 171a and 171b along paths Ra and Rb under control of the CPU 10.

The inserting units 171a and 171b generate control bits having values different from each other. Thus, control bits of values different from each other are given to the bit strings Da and Db.

When the input of one client signal Sb is not detected, the CPU 10 controls the switch circuit 16 to the multi state to switch the path Rb of the bit string Db from the port d.

FIG. 16 is a diagram illustrating an example of an operation for switching the path Rb through the inserting unit 171b. In FIG. 16, constituents common to those in FIG. 15 are denoted by the same reference numerals, and description thereof is omitted.

Although a case where one client IF module 14b is not implemented will be described according to this embodiment, the path Rb may be switched by the same operations as described below also in a case where the client IF module 14b has a non-operating state. Based on the coupling information, the CPU 10 detects that the client signal Sa is input and the client signal Sb is not input. Thus, as described above, the CPU 10 controls the coupling state of the switch circuit 16 to the straight state.

The CPU 10 switches the path Rb through the one inserting unit 171b to the path Ra through the other inserting unit 171a. Thus, the bit string Da from the port d is input to the inserting unit 171a to which the bit string Da from the port c is also input. Therefore, a common control bit is given to the bit strings Da from the ports c and d.

FIG. 17 is a flowchart illustrating another example of processing for controlling a coupling state of the switch circuit 16. In FIG. 17, constituents common to those in FIG. 6 are denoted by the same reference numerals, and description thereof is omitted.

If the client IF modules 14a and 14b that are not implemented and have a non-operating state do not exist (No in step St2 and No in step St5), the CPU 10 controls the coupling state of the switch circuit 16 to the straight state (step St6). Next, the CPU 10 sets the paths Ra and Rb through the inserting units 171a and 171b (step St8).

If the client IF modules 14a and 14b that are not implemented or have a non-operating state exist (Yes in step St2 and Yes in step St5), the CPU 10 controls the coupling state of the switch circuit 16 to the multi state (step St3). Next, the CPU 10 sets two paths Ra and Rb' through the common inserting unit 171a (step St7).

In this manner, the CPU 10 switches the paths Ra, Rb, Rb' through the inserting units 171a and 171b.

The OH/FEC giving unit 171 gives a common control bit to the bit string Da included in the other client signal Sa selected instead of the client signal Sb the input of which is not detected based on the detection result of the inputs of the client signals Sa and Sb. Thus, the values of the two bit strings Da to be input to the mapping unit 170 may be identical. Therefore, the modulation rate of the optical modulator 19 decreases, and the waste of the frequency band may be suppressed.

Having described the case where the input of the client signal Sb is not detected according to this embodiment, the CPU 10 in a case where the input of the other client signal Sa is not detected switches the path Ra such that the bit string Da from the port c is input to the inserting unit 171b to which the bit string Da from the port d is input in the same manner as described above.

Having described the configuration according to this embodiment in which the OH/FEC giving unit 171 is added to the DSP 17 of the first embodiment, embodiments are not limited thereto. For example, also when the OH/FEC giving unit 171 is provided in the DSP 17 of the second embodiment, a common control bit may be given to the bit strings Da to Dd by the same method as described above.

Having described the CPUs 10 and 10a as a controller for the switch circuits 16 and 16a and the DSP 17 according to the embodiments, a circuit configured by hardware such as a field-programmable gate array (FPGA) or an application-specified integrated circuit (ASIC) may be applied instead of the CPUs 10 and 10a or in addition to the CPUs 10 and 10a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmitting apparatus, comprising:
   a first processor circuit;
   a second processor circuit;
   a modulation circuit; and
   a switch circuit,
   wherein the first processor circuit is configured to execute a generating process that includes
      mapping each of a plurality of bit strings to a symbol in predetermined order for each number of bits according to a multivalued degree of a multilevel modulation method, and
      generating a symbol information piece according to the symbol,
   wherein the modulation circuit is configured to modulate light in accordance with the symbol information piece based on the multilevel modulation method;
   wherein the second processor circuit is configured to execute a detecting process that includes detecting each of inputs of a plurality of data signals,
   wherein the switch circuit is configured to select the plurality of bit strings based on a detection result of inputs of the plurality of data signals,
   wherein the second processor circuit is further configured to
   execute a first selecting process when an input of each of the plurality of data signals is detected by the detecting process, the selecting process being configured to cause the switch circuit to select a bit string included in each of the plurality of data signals, and
   execute a second selecting process when an input of at least one of the plurality of data signals is not detected by the detecting process, the second selecting process being configured to cause the switch circuit to select a bit string included in the data signal the input of which is detected instead of the data signal the input of which is not detected such that the identical symbol information pieces are serially generated in the predetermined order,
   wherein the switch circuit is configured to output the plurality of bit strings from a plurality of output ports to the generating process in the first processor circuit,
   wherein the second selecting process is configured to cause the switch circuit to output a bit string included in the data signal the input of which is detected from at least two output ports among the plurality of output ports.

2. The transmitting apparatus according to claim 1,
   wherein the second selecting process is configured to execute a third selecting process when the number of data signals the inputs of which are not detected and the number of data signals the inputs of which are detected are plural and equal among the plurality of data signals, the third selecting process being configured to individually select bit strings included in the data signals the inputs of which are detected instead of each of data signals the inputs of which are not detected.

3. The transmitting apparatus according to claim 1,
   wherein the detecting process detects each of inputs of the plurality of data signals by determining whether an input source device of each of the plurality of data signals is implemented in the transmitting apparatus or not.

4. The transmitting apparatus according to claim 1,
   wherein the detecting process is configured to detect each of inputs of the plurality of data signals by determining whether an input source device of each of the plurality of data signals has an operating state or not.

5. The transmitting apparatus according to claim 1,
   wherein the first processor circuit is further configured to execute a giving process that includes giving a control bit relating to a control of the plurality of bit strings to each of the plurality of bit strings,
   wherein the giving process is configured to give the common control bit to the bit string included in the data signal selected instead of the other data signal the input of which is not detected among the plurality of bit strings based on a detection result of inputs of the plurality of data signals.

6. A transmitting method implemented by a transmitting apparatus, the transmitting method comprising:
   mapping each of a plurality of bit strings to a symbol in predetermined order for each number of bits according to a multivalued degree of a multilevel modulation method and generating a symbol information piece according to the symbol;
   modulating light in accordance with the symbol information piece based on the multilevel modulation method;
   detecting each of inputs of a plurality of data signals; and
   selecting the plurality of bit strings based on a detection result of inputs of the plurality of data signals,
   wherein a selector for the plurality of bit strings
   when an input of each of the plurality of data signals is detected, selects a bit string included in each of the plurality of data signals, and
   when an input of at least one of the plurality of data signals is not detected, selects a bit string included in the data signal the input of which is detected instead of the data signal the input of which is not detected such that the identical symbol information pieces are serially generated in the predetermined order,
   wherein the switch circuit is configured to output the plurality of bit strings from a plurality of output ports to the generating process in the first processor circuit,
   wherein the second selecting process is configured to cause the switch circuit to output a bit string included in the data signal the input of which is detected from at least two output ports among the plurality of output ports.

* * * * *